(12) United States Patent
Hazel et al.

(10) Patent No.: US 9,747,293 B2
(45) Date of Patent: Aug. 29, 2017

(54) METHOD AND SYSTEM FOR STORAGE AND RETRIEVAL OF INFORMATION

(71) Applicant: Deep Information Sciences, Inc., Waltham, MA (US)

(72) Inventors: Thomas Hazel, Andover, MA (US); Jason P. Jeffords, Bedford, NH (US); Gerard L. Buteau, Durham, NH (US)

(73) Assignee: DEEP INFORMATION SCIENCES, INC., Waltham, MA (US)

( * ) Notice: Subject to any disclaimer, the term of this patent is extended or adjusted under 35 U.S.C. 154(b) by 657 days.

(21) Appl. No.: 13/781,339

(22) Filed: Feb. 28, 2013

(65) Prior Publication Data
US 2013/0226931 A1    Aug. 29, 2013

Related U.S. Application Data

(60) Provisional application No. 61/604,311, filed on Feb. 28, 2012.

(51) Int. Cl.
*G06F 17/30* (2006.01)

(52) U.S. Cl.
CPC .. *G06F 17/30094* (2013.01); *G06F 17/30185* (2013.01); *G06F 17/301* (2013.01); *G06F 17/30091* (2013.01)

(58) Field of Classification Search
CPC ......... G06F 17/30067; G06F 17/30185; G06F 17/30466
USPC ....... 707/754, 821, 600, 736, 637, 713, 715; 711/141, 156, 162
See application file for complete search history.

(56) References Cited

U.S. PATENT DOCUMENTS

| | | | | |
|---|---|---|---|---|
| 5,283,894 A | * | 2/1994 | Deran | G06F 17/30327 707/704 |
| 5,551,020 A | * | 8/1996 | Flax | G06F 3/0601 |
| 5,819,204 A | * | 10/1998 | Moore et al. | 702/69 |
| 6,003,030 A | * | 12/1999 | Kenner | G06F 17/30781 |
| 6,516,443 B1 | * | 2/2003 | Zook | G11B 20/10009 714/792 |
| 6,697,363 B1 | * | 2/2004 | Carr | 370/389 |
| 6,898,098 B2 | * | 5/2005 | Snider et al. | 365/49.18 |
| 6,970,370 B2 | * | 11/2005 | Forbes | G11C 17/04 365/145 |
| 6,996,674 B2 | * | 2/2006 | Chiu | G06F 11/2089 709/201 |
| 7,065,619 B1 | * | 6/2006 | Zhu | G06F 11/1453 707/999.201 |
| 7,443,841 B2 | * | 10/2008 | Davis | 370/356 |
| 7,447,850 B1 | * | 11/2008 | Del Rosso et al. | 711/156 |
| 7,558,786 B2 | * | 7/2009 | Robson et al. | |
| 7,689,633 B1 | * | 3/2010 | Li et al. | 707/821 |
| 7,840,575 B2 | * | 11/2010 | Chandrasekaran | 707/754 |

(Continued)

*Primary Examiner* — Frantz Coby
(74) *Attorney, Agent, or Firm* — Arent Fox LLP

(57) ABSTRACT

A method, a system, and a computer program product for storing and retrieving information are provided. The system receives information. Thereafter, the system organizes the information for optimal storage and retrieval based on qualities of a storage medium. The organizing may include optimizing the information for sequential read and/or write access. The information may be organized in an append-only manner. Once the information has been organized, the apparatus presents and/or stores the organized information.

53 Claims, 38 Drawing Sheets

(56) References Cited

U.S. PATENT DOCUMENTS

| | | | |
|---|---|---|---|
| 7,894,532 B2* | 2/2011 | Otsuka | 375/240.23 |
| 7,912,832 B2* | 3/2011 | Krieg | G06F 17/30882 707/713 |
| 8,234,468 B1* | 7/2012 | Deshmukh et al. | 711/162 |
| 8,347,050 B2* | 1/2013 | Bernstein et al. | 711/162 |
| 8,762,395 B2* | 6/2014 | Chandrasekaran | 707/754 |
| 8,793,467 B2* | 7/2014 | Colgrove et al. | 711/206 |
| 8,954,710 B2* | 2/2015 | Colgrove et al. | 711/208 |
| 2003/0079019 A1* | 4/2003 | Lolayekar et al. | 709/226 |
| 2003/0126019 A1* | 7/2003 | Taylor | G06Q 20/202 705/21 |
| 2006/0109765 A1* | 5/2006 | Chen | 369/53.1 |
| 2006/0112155 A1* | 5/2006 | Earl et al. | 707/206 |
| 2007/0043879 A1* | 2/2007 | Vidya Sagar | 709/246 |
| 2008/0091704 A1* | 4/2008 | Yennie | 707/102 |
| 2009/0059757 A1* | 3/2009 | Haustein et al. | 369/53.42 |
| 2009/0180369 A1* | 7/2009 | Kimmelmann et al. | 369/53.44 |
| 2010/0174741 A1* | 7/2010 | Shinjo et al. | 707/769 |
| 2010/0191919 A1* | 7/2010 | Bernstein et al. | 711/141 |
| 2010/0274786 A1* | 10/2010 | Harris et al. | 707/737 |
| 2011/0107042 A1* | 5/2011 | Herron | G06F 3/0605 711/161 |
| 2011/0124336 A1* | 5/2011 | Ishii | G01S 5/0018 455/434 |
| 2011/0161200 A1* | 6/2011 | Carmona et al. | 705/27.1 |
| 2011/0261660 A1* | 10/2011 | Sutardja | G11B 5/5526 369/1 |
| 2012/0284317 A1* | 11/2012 | Dalton | G06F 17/301 707/827 |
| 2013/0311426 A1* | 11/2013 | Erdogan et al. | 707/610 |
| 2014/0188947 A1* | 7/2014 | Morris | G06F 17/30321 707/812 |
| 2015/0149870 A1* | 5/2015 | Kozat | G06F 11/1096 714/772 |

\* cited by examiner

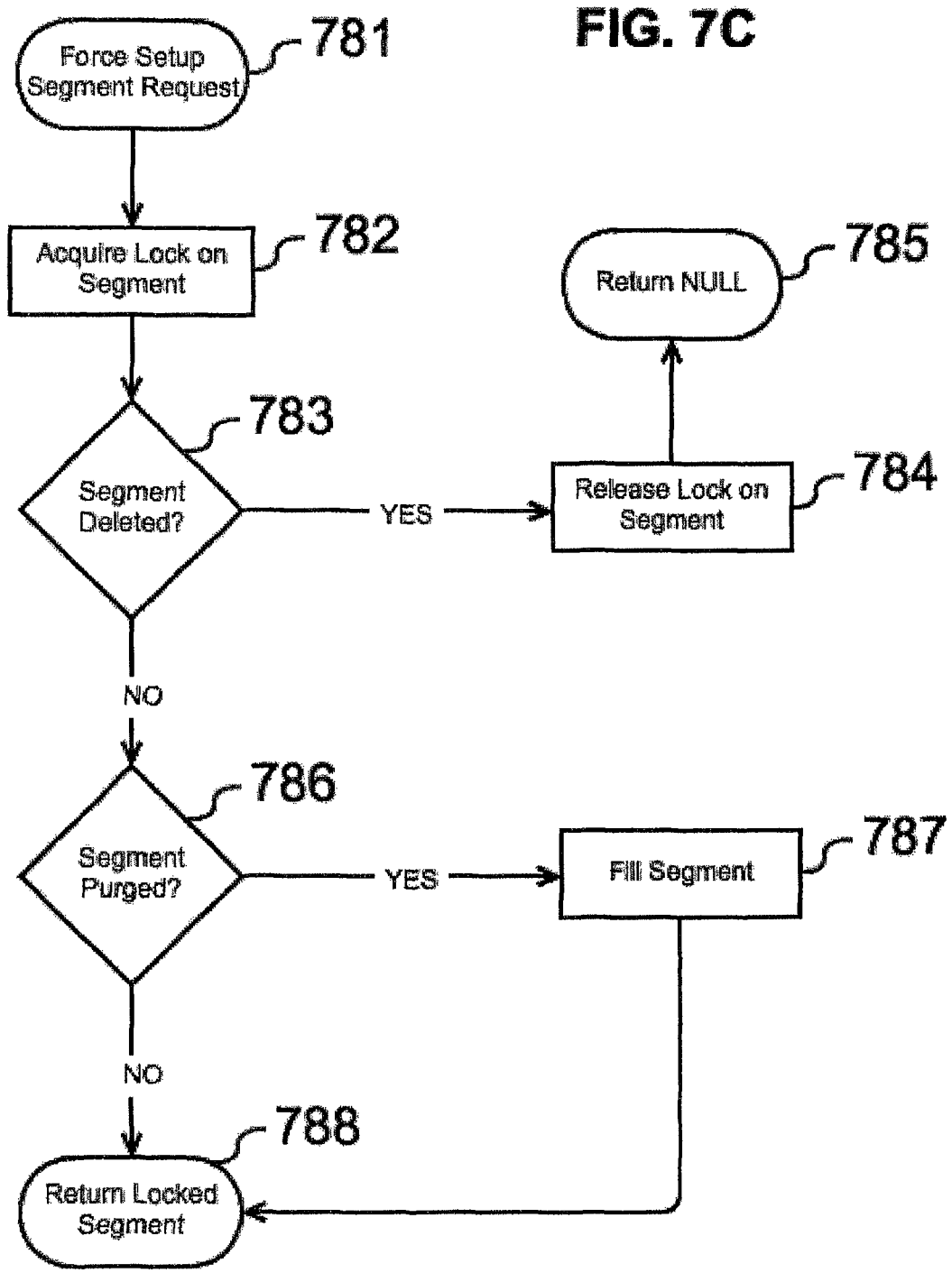

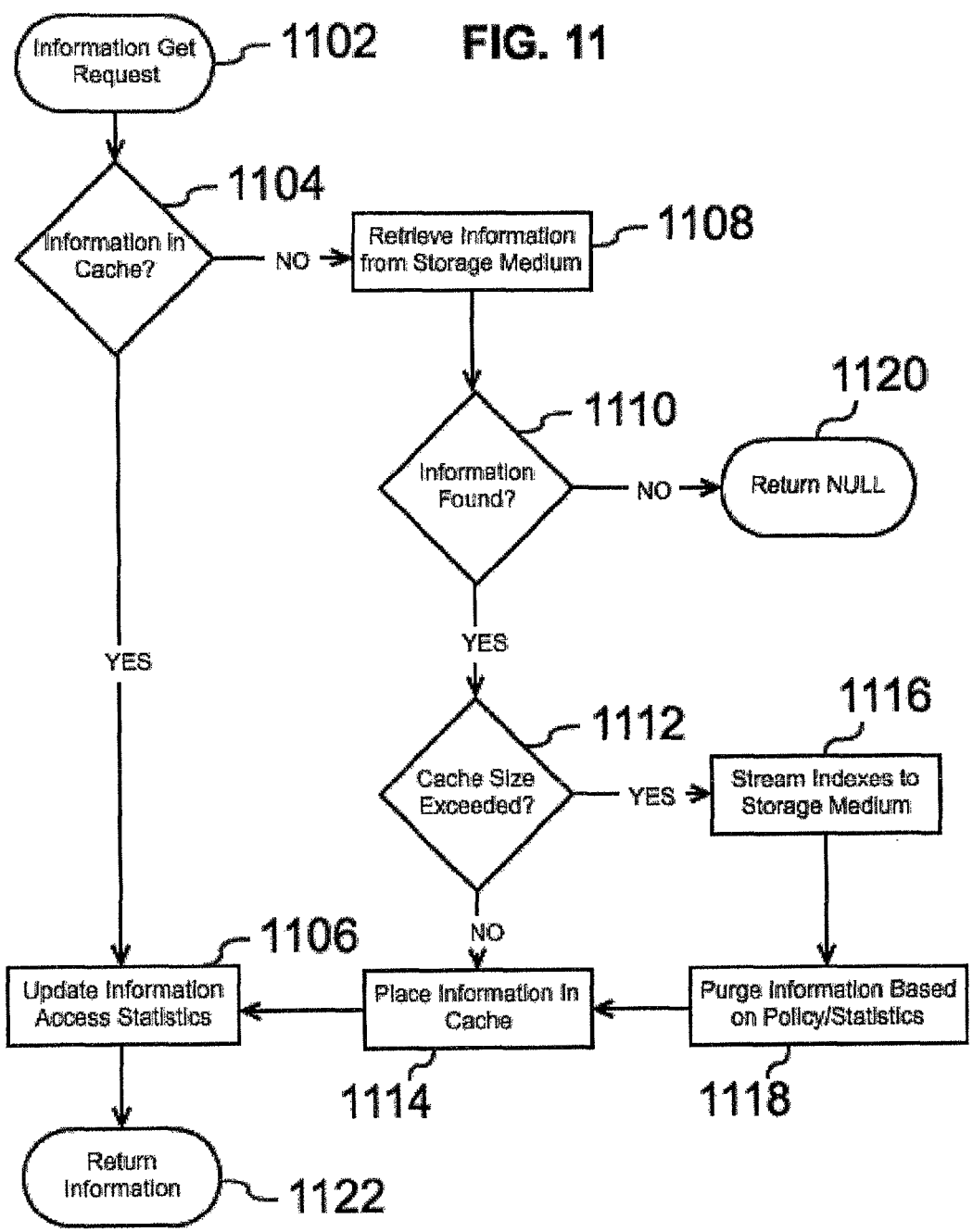

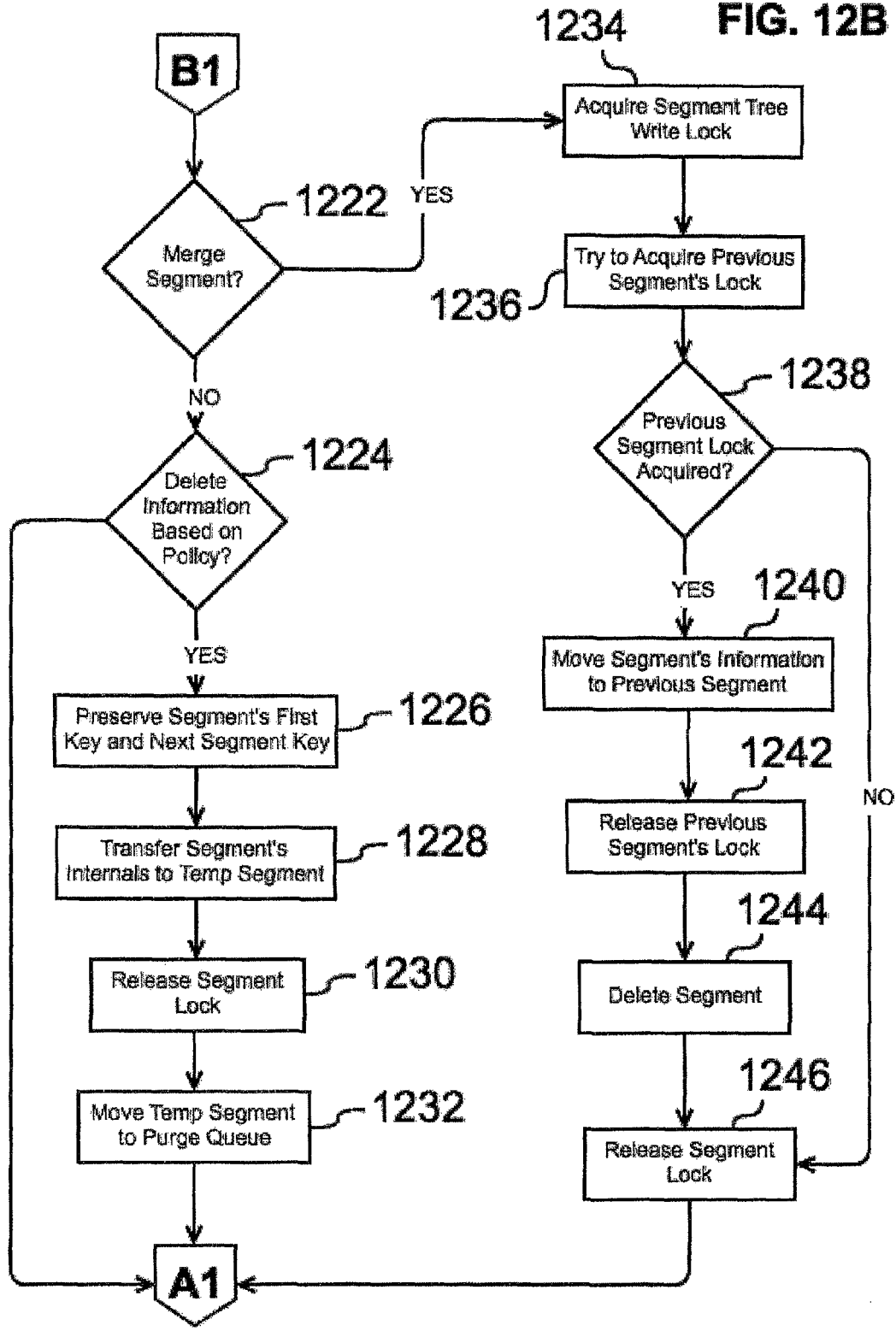

FIG. 20A
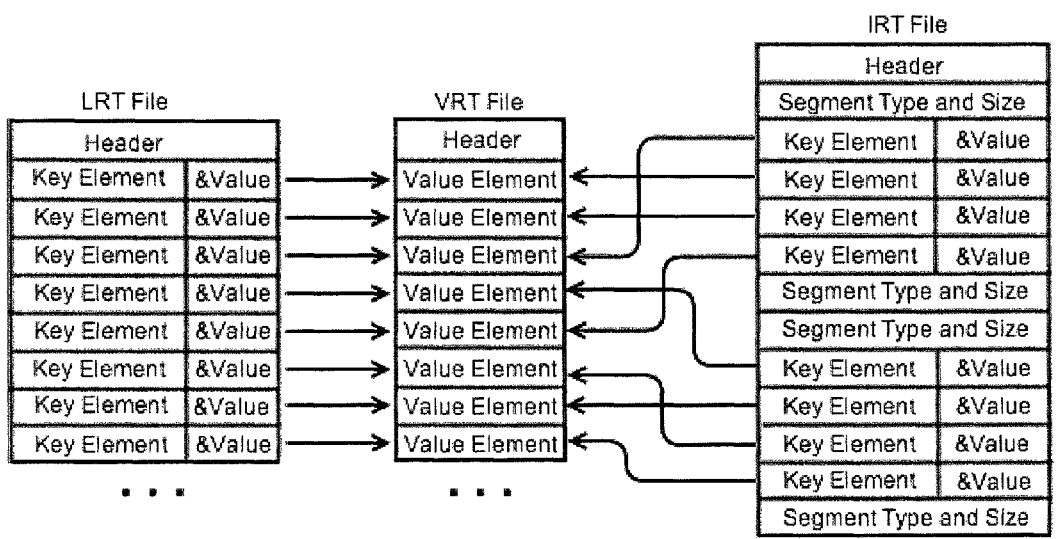
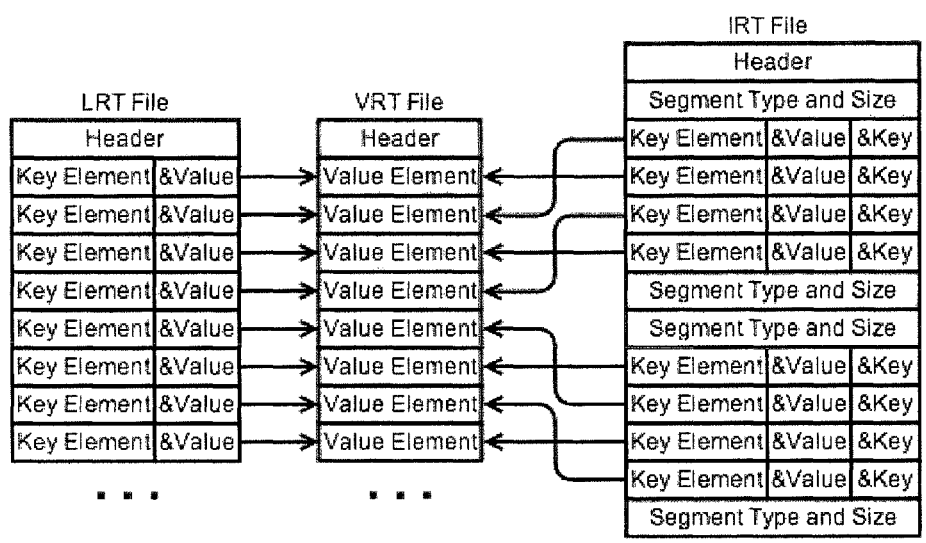
FIG. 20B

FIG. 21A

| Datastore UUID |
|---|
| Index UUID |
| File UUID |
| Preceding File UUID |

FIG. 21B

| Flags |
|---|
| File Type |
| Encoding Type |
| Header Length |
| Header Data |

FIG. 22A

Fixed Size Key Element

| State Flags | Key |

FIG. 22B

Fixed Size Value Element

| Value |

FIG. 22C

Variable Size Key Element

Size Delimited

| State Flags | Key Size | Key |

Framed

| State Flags | Key | EOE |

FIG. 22D

Variable Size Value Element

Size Delimited

| Value Size | Value |

Framed

| Value | EOE |

FIG. 23A

| Header |
|---|
| Key Element |
| Key Element |
| Key Element |
| Key Element |

| Header |
|---|
| Segment Size |
| &Value |
| Key Element |
| Key Element |
| Key Element |
| Key Element |
| Segment Size |

| Header |
|---|
| Segment Size |
| &Key |
| Key Element |
| Key Element |
| Key Element |
| Key Element |
| Segment Size |

```
          1         2         3         4         5
  First ----- E  +---- G  +------ L  +---- X  +------ Last
      : A B C :  : E F :  : G H I :  : L M :  : X Y Z :
      +-------+  +-----+  +-------+  +-----+  +-------+
```

FIG. 29B

```
          1                   3         4
  First ----- E         +------ L  +---- X
      : A B C :         : G H I :  : L M :
```

FIG. 29C

| customerId | storeId | isPreferred |
|---|---|---|
| 12345 | 1000 | False |
| 12345 | 1001 | False |
| 12345 | 1002 | False |
| 12346 | 1000 | True |
| 12346 | 1001 | False |

FIG. 30A

| | Primary Key | isUp |
|---|---|---|
| 0 | 10 | True |
| 1 | 20 | True |
| 2 | 30 | False |
| 3 | 40 | True |
| 4 | 50 | False |
| 5 | 60 | False |

FIG. 30B

| Header |  |
|---|---|
| Segment Size = 4 | |
| False.30 | 2 |
| False.50 | 4 |
| False.60 | 5 |
| True.10 | 0 |
| Segment Size = 4 | |
| Segment Size = 2 | |
| True.20 | 1 |
| True.40 | 3 |
| Segment Size = 2 | |

FIG. 31A

| Header |  |
|---|---|
| Segment Size = 4 | |
| False | |
| 30 | 2 |
| 50 | 4 |
| 60 | 5 |
| True | |
| 10 | 0 |
| Segment Size = 4 | |
| Segment Size = 2 | |
| True | |
| 20 | 1 |
| 40 | 3 |
| Segment Size = 2 | |

FIG. 31B

```
Read State    :    Write States
              :
              :    +---------+
              :    : Created :  ----+
              :    +---------+ <-+  :
              :       :          :  :
              :       V          :  :
+------+      :    +---------+   :  :
: Read :  ---->   : Updated :    :  :
+------+      :    +---------+   :  :
    :         :       :          :  :
    :         :       V          :  :
    :         :    +---------+   :  :
    +---------->   : Deleted :  --+ :
              :    +---------+ <---+
              :
```

FIG. 32

```
         LRT A                    LRT B
    +-------------+           +-------------+
    : Flags : Key :           : Flags : Key :
    +-------------+           +-------------+
 0  :   S   :  1  :        0  :   S   : 50  :
    +-------------+           +-------------+
    :       :  3  :           :   E   : 70  :
    +-------------+           +-------------+
    :   E   :  5  :        2  :   S   : 41  :
    +-------------+           +-------------+
 3  :  S E  : 10  :           :       : 42  :
    +-------------+           +-------------+
 4  :   S   :  2  :           :   E   : 43  :
    +-------------+           +-------------+
    :   E   :  4  :        5  :  S E  : 80  :
    +-------------+           +-------------+
```

FIG. 33A

```
+-----------------------------------+
: Flags : UUID : Size or Position   :
+-----------------------------------+
```

FIG. 33B

```
       Transaction Log
+-----------------------+
: Flags : UUID : S or P :
+-----------------------+
:   B   : TID1 :  S 1   :
+-----------------------+
:   E   : LRTA :  P 0   :
+-----------------------+
:   C   : TID1 :  P 0   :
+-----------------------+
:   B   : TID2 :  S 2   :
+-----------------------+
:       : LRTA :  P 3   :
+-----------------------+
:   E   : LRTB :  P 0   :
+-----------------------+
:   C   : TID2 :  P 3   :
+-----------------------+
:   B   : TID3 :  S 2   :
+-----------------------+
:       : LRTA :  P 4   :
+-----------------------+
:   E   : LRTB :  P 2   :
+-----------------------+
:   B   : TID4 :  S 1   :
+-----------------------+
:   E   : LRTB :  P 5   :
+-----------------------+
:   C   : TID4 :  P 11  :
+-----------------------+
:   C   : TID3 :  P 8   :
+-----------------------+
```

FIG. 34

METHOD AND SYSTEM FOR STORAGE AND RETRIEVAL OF INFORMATION

CLAIM OF PRIORITY UNDER 35 U.S.C. §119

The present Application for Patent claims priority to Provisional Application No. 61/604,311 entitled "METHOD AND SYSTEM FOR APPEND-ONLY STORAGE AND RETRIEVAL OF INFORMATION" filed Feb. 28, 2012, and assigned to the assignee hereof and hereby expressly incorporated by reference herein.

REFERENCE TO CO-PENDING APPLICATIONS FOR PATENT

The present Application for Patent is related to the following U.S. Patent Applications:

Provisional Application No. 61/613,830 entitled "METHOD AND SYSTEM FOR INDEXING IN DATASTORES" filed Mar. 21, 2012, the entire contents of which are expressly incorporated by reference herein; and Provisional Application No. 61/638,886 entitled "METHOD AND SYSTEM FOR TRANSACTION REPRESENTATION APPEND-ONLY DATASTORES" filed Apr. 25, 2012, the entire contents of which are expressly incorporated by reference herein.

BACKGROUND

Field

The present disclosure relates generally to a method, apparatus, system, and computer readable media for optimizing storage of information in both on-disk and in-memory representation, and more particularly, relates to optimized, sequential organization in files for both on-disk and in-memory representations of information.

Background

Traditional datastores and databases use sequential log files and paged datastore/database files. This approach has many weaknesses that are difficult if not impossible to overcome without significant architectural and algorithmic changes. Such drawbacks include severe performance degradation with random access patterns; seeks occurring to random pages even with sequential data; data being written at least twice, once to the log file(s) and again to the datastore/database file(s); system startup and shutdown being very slow as log files are read/purged and error detection and correction is performed; and error recovery being very complex since data can be partially written to existing pages.

SUMMARY

In light of the above described problems and unmet needs as well as others, systems and methods are presented for providing optimized, sequential storage of information for both on-disk and in-memory representations of such information.

For example, aspects presented herein provide advantages such as optimization of reads and writes for sequential disk access, data is written only once, indexes may reference data values rather than data being replicated in indexes, startup and shutdown are instantaneous, and error recovery is extremely simple as data and indexes are never overwritten.

Additional advantages and novel features of these aspects will be set forth in part in the description that follows, and in part will become more apparent to those skilled in the art upon examination of the following or upon learning by practice of the invention.

BRIEF DESCRIPTION OF THE DRAWINGS

Various aspects of the systems and methods will be described in detail, with reference to the following figures, wherein:

FIG. 7C illustrates a flow chart of receiving and processing a force segment setup request in accordance with aspects of the present invention.

FIG. 11 illustrates a flow chart of information caching in accordance with aspects of the present invention.

FIGS. 12A and 12B illustrate flow charts of memory management in accordance with aspects of the present invention.

FIGS. 20A and 20B illustrate example logical representations of file layout and indexing in accordance with aspects of the present invention.

FIGS. 21A and 21B illustrate example information headers in accordance with aspects of the present invention.

FIGS. 22A-D illustrate example logical representations of a fixed and variable size key/value elements in accordance with aspects of the present invention.

FIGS. 23A, 23B, and 23C illustrate an example logical representations of an LRT file and an IRT file with implicit pointers in accordance with aspects of the present invention.

FIGS. 29A-C illustrate examples of a key space in accordance with aspects of the present invention.

FIGS. 30A and 30B illustrate example logical representation of a relation requiring a composite primary key and with a non-unique key in accordance with aspects of the present invention.

FIGS. 31A and 31B illustrate example logical representation of a BRT and a compressed BRT for non-unique keys in accordance with aspects of the present invention.

FIG. 32 illustrates an example logical representation of valid key/value state transitions in accordance with aspects of the present invention.

FIG. 33A illustrates an example group delineation in LRT files in accordance with aspects of the present invention.

FIG. 33B illustrates an example transaction log.

FIG. 34 illustrates an example transaction log spanning LRTA and LRTB in accordance with aspects of the present invention.

DETAILED DESCRIPTION

Figure 1:
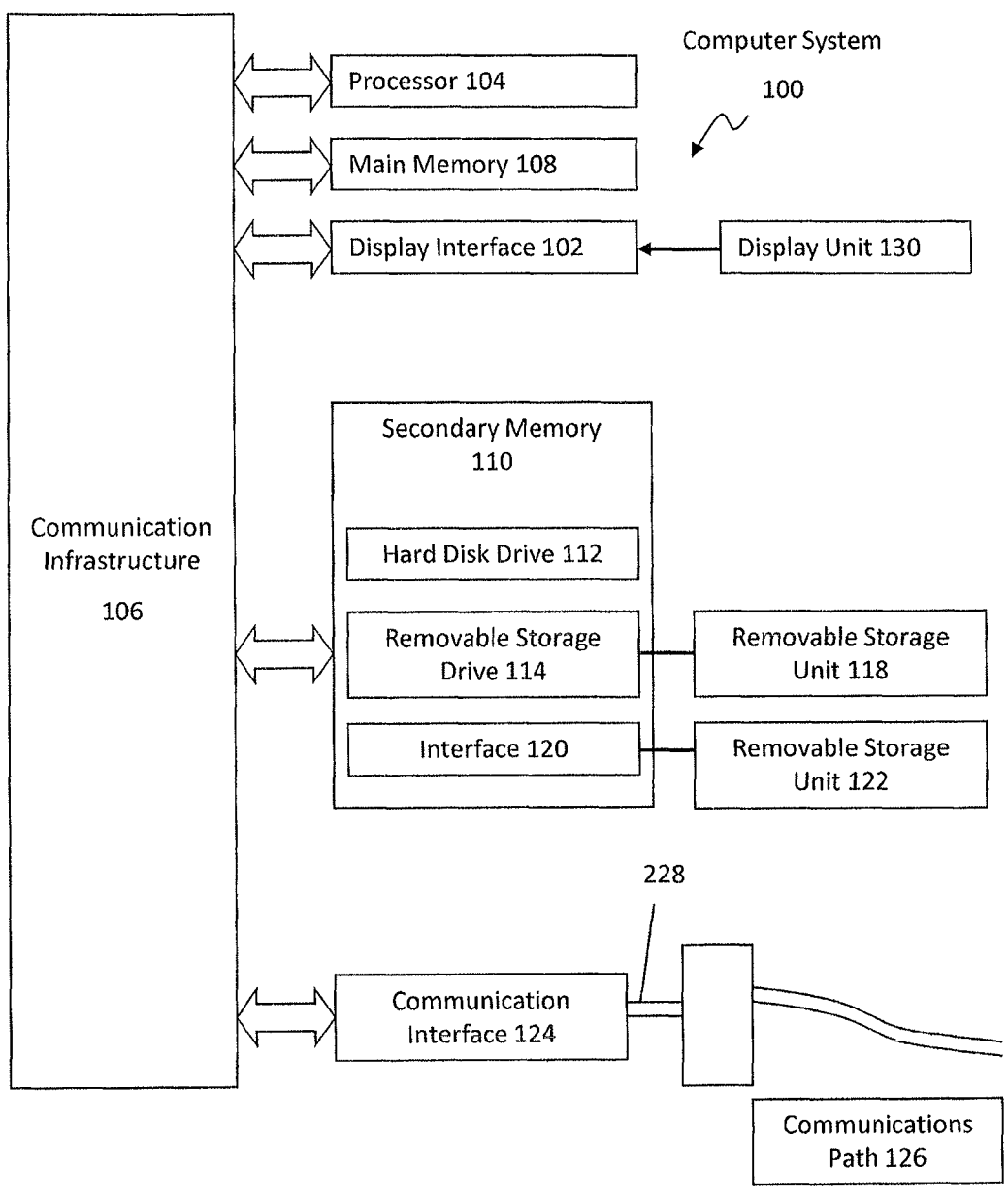
FIG. 1 presents an example system diagram of various hardware components and other features, for use in accordance with aspects of the present invention.

These and other features and advantages in accordance with aspects of this invention are described in, or will become apparent from, the following detailed description of various example illustrations and implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of systems capable of providing optimized, sequential representations of information for both disk and memory, in accordance with aspects of the present invention will now be presented with reference to various apparatuses and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented using a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example illustrations, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise random-access memory (RAM), read-only memory (ROM), Electrically Erasable Programmable ROM (EEPROM), compact disk (CD) ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 presents an example system diagram of various hardware components and other features, for use in accordance with an example implementation in accordance with aspects of the present invention. Aspects of the present invention may be implemented using hardware, software, or a combination thereof, and may be implemented in one or more computer systems or other processing systems. In one implementation, aspects of the invention are directed toward one or more computer systems capable of carrying out the functionality described herein. An example of such a computer system 100 is shown in FIG. 1.

Computer system 100 includes one or more processors, such as processor 104. The processor 104 is connected to a communication infrastructure 106 (e.g., a communications bus, cross-over bar, or network). Various software implementations are described in terms of this example computer system. After reading this description, it will become apparent to a person skilled in the relevant art(s) how to implement aspects of the invention using other computer systems and/or architectures.

Computer system 100 can include a display interface 102 that forwards graphics, text, and other data from the communication infrastructure 106 (or from a frame buffer not shown) for display on a display unit 130. Computer system 100 also includes a main memory 108, preferably RAM, and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc., which is read by and written to removable storage drive 114. As will be appreciated, the removable storage unit 118 includes a computer usable storage medium having stored therein computer software and/or data.

In alternative implementations, secondary memory 110 may include other similar devices for allowing computer programs or other instructions to be loaded into computer system 100. Such devices may include, for example, a removable storage unit 122 and an interface 120. Examples of such may include a program cartridge and cartridge interface (such as that found in video game devices), a removable memory chip (such as an EPROM, or programmable read only memory (PROM)) and associated socket, and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of signals 128, which may be electronic, electromagnetic, optical or other signals capable of being received by communications interface 124. These signals 128 are provided to communications interface 124 via a communications path (e.g., channel) 126. This path 126 carries signals 128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 114, a hard disk installed in hard disk drive 112, and signals 128. These computer program products provide software to the computer system 100. Aspects of the invention are directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features in accordance with aspects of the present invention, as discussed herein. In particular, the computer programs, when executed, enable the processor 110 to perform various features. Accordingly, such computer programs represent controllers of the computer system 100.

In an implementation where aspects of the invention are implemented using software, the software may be stored in a computer program product and loaded into computer system 100 using removable storage drive 114, hard drive 112, or communications interface 120. The control logic (software), when executed by the processor 104, causes the processor 104 to perform various functions as described herein. In another implementation, aspects of the invention are implemented primarily in hardware using, for example, hardware components, such as application specific integrated circuits (ASICs). Implementation of the hardware state machine so as to perform the functions described herein will be apparent to persons skilled in the relevant art(s).

In yet another implementation, aspects of the invention are implemented using a combination of both hardware and software.

Figure 2:
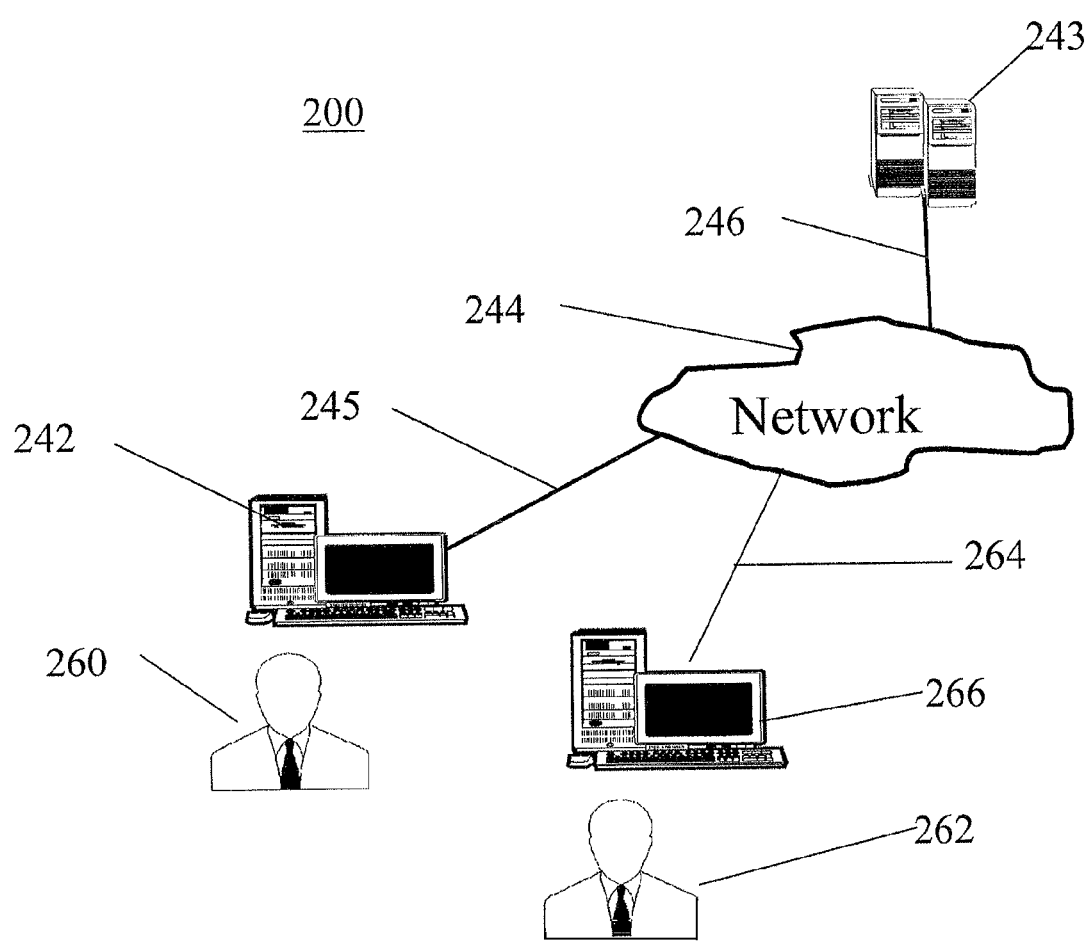
FIG. 2 is a block diagram of various example system components, in accordance with aspects of the present invention.

FIG. 2 is a block diagram of various example system components, in accordance with aspects of the present invention. FIG. 2 shows a communication system 200 usable in accordance with the aspects presented herein. The communication system 200 includes one or more accessors 260, 262 (also referred to interchangeably herein as one or more "users" or clients) and one or more terminals 242, 266. In an implementation, data for use in accordance with aspects of the present invention may be, for example, input and/or accessed by accessors 260, 264 via terminals 242, 266, such as personal computers (PCs), minicomputers, mainframe computers, microcomputers, telephonic devices, or wireless devices, such as personal digital assistants ("PDAs") or a hand-held wireless devices coupled to a server 243, such as a PC, minicomputer, mainframe computer, microcomputer, or other device having a processor and a repository for data and/or connection to a repository for data, via, for example, a network 244, such as the Internet or an intranet, and couplings 245, 246, 264. The couplings 245, 246, 264 include, for example, wired, wireless, or fiberoptic links.

Aspects described herein provide a scalable, high-performance, transactional, multi-index, low-maintenance, resilient datastore. Aspects may be applied, e.g., to cloud computing. Aspects include storing all persistent information in append only files, while advanced data structures and algorithms may be applied in order to optimize the datastore's performance.

Whereas traditional databases and datastores are designed with sequential log files and paged data and index files, this design has several weaknesses, including
1. Severe performance degradation with random access patterns,
2. Seeks to random pages even with sequential data.
3. Data is written at least twice, once to the log file(s) and again to the datastore/database files,
4. System startup and shutdown can be very slow as log files are read/purged and error detection and correction is performed, and
5. Error recovery can be very complex since data can be partially written to existing pages and these changes must be rolled back (or rolled forward).

Aspects presented herein use, e.g., append-only files for all persistent data, e.g., both data and indexes. This provides a number of advantages, including:

1. Reads and writes are optimized for sequential disk access, the fastest disk access available.
2. Data is written only once.
3. Indexes reference data values, data does not have to be replicated in indexes,
4. Startup and shutdown are instantaneous,
5. Error recovery is extremely simple as data and indexes are never overwritten,
6. Concurrency is maximized.

Aspects include a datastore that maintains an on-disk and in-memory representation of a key ordered hash map storing (key, value) tuples. Each key is unique and values may be associated with keys. Values may be added and modified by specifying the unique key and its associated value. The unique key used to modify the (key, value) relationship is known as the primary key. Composite, secondary, and non-unique keys (indexes) are also supported. Queries may be performed by exact key lookup as well as by key range. Efficient key range queries are enabled by tree-like in-memory data structures and ordered on-disk indexes. Group operations/transactions may be supported for all operations, e.g., Create, Read, Update, Delete (CRUD). Operations are Atomic, Consistent, Isolated and Durable (ACID).

An append-only datastore may comprise meta data files, data files and index files. Meta data files provide information about the datastore and its files. Data files contain data values and index files provide indexing information for the data values stored in the data files. All files may be append-only (i.e. all writes occur at the end of files). Each file may comprise a header describing its format followed by a sequence of elements.

Three main file types may be used in connection with the datastore, e.g., LRT—real time key logging files, VRT—real time value logging files, and IRT—real time key tree files. LRT files maintain indexes into VRT files. IRT files maintain indexes into VRT files and/or LRT files.

FIGS. 20A and 20B illustrate logical representations of file layout and indexing. The LRT and VRT files may be streamed to disk in creation/modification order, for example. The IRT file may be composed of creation ordered segments containing ordered key/value pointers. Segments may be cached and written using multiple heuristics and cost minimization functions.

A datastore may be composed of many LRT, VRT and IRT files. There may be a 1-to-1 relationship between LRT and VRT files. IRT files may span multiple VRT files, for example, providing an ordered index of unordered values.

Additionally, meta data files may, among other things, be used to provide information about datastores and the LRT, IRT and VRT files that compose them. There may be, e.g., two major meta data files (1) File Order—that describes the order of LRT, IRT and VRT files, and (2) Schema—that describes the schema in effect over time and in relation to LRT, VRT and BRT files.

Files may have a two-part file header. A first part, e.g. the File Information Header, may describe any of the file's datastore Universally Unique Identifier (UUID), index UUID, its file UUID, and the previous file's UUID. The second part, e.g., the File Format Header, may describe any of the file's type, internal structure and format.

FIG. 21A illustrates an example File information header usable in accordance with aspects of the present invention. Datastore UUID indicates the datastore of which the file is a member. Index UUID indicates the index for which the file contains information. The file's UUID indicates the UUID uniquely identifying the file. The Preceding File UUID indicates the UUID of the file immediately preceding this file, or zero if this is the first file in the file sequence. The file information header may be used to identify datastore and index membership and the relationship among files forming the datastore, its meta-data, data and indexes.

FIG. 21B illustrates an example logical representation of a File Format Header. The file format header may, for example, include any of a number of Flags that indicate common and context specific information about this file, a File Type that indicates the type of the file, e.g. VRT, LRT, IRT or meta-data, and Encoding Type, which indicates how the file is encoded, a Header Length that indicates the length of the header including header data, and Header Data that indicates file and encoding type specific header data.

Keys may be stored in LRT and IRT files and Values may be stored in VRT files. Keys and values may be fixed size or variable size. When of a fixed size, keys and values may be stored without any additional length or framing information. When variable size, length information or framing is employed to delineate keys and values. In one example implementation, four possible key/value size combinations may be used (1) Fixed size key and fixed size value, (2) Fixed size key and variable size value, (3) Variable size key and fixed size value, and (4) Variable size key and variable size value.

Fixed size keys and fixed sized values may be stored as-is, without any additional length or framing information with each key/value. In this case, key size and value size may be stored once, for example, describing the size of keys and values for an entire file.

FIG. 22A illustrates an example logical representation of a fixed size key element. FIG. 22B illustrates an example logical representation of a fixed size value element. The fixed size value may be stored as just the value. FIG. 22C illustrates an example logical representation of a variable size key element. Variable sized keys may be stored with a key size or may be framed, for example. FIG. 22D illustrates an example logical representation of a variable size value element. Variable sized values may be stored with a value size or may be framed.

Keys and values may have additional information associated with them. This information may be encoded in state flags. State flags may indicate:
1) Active or Deleted—key/value is active or deleted
2) Genesis or Updated—key/value is an initial creation or update
3) Unmoved or Reordered—key/value is unmoved or has been moved/defragmented
4) Normal Operational State or System Overloaded—when operating in real-time mode, indicates system overload and key/value dropping
5) Group Member or Start Group—key/value is simply a group member, or this is a start of group indication
6) Group Member or End Group—key/value is simply a group member or, this is an end of group indication
7) Normal Operation or Error Correction Occurred—normal operation, or an error correction occurred
8) Normal Operation or Rolled Back Group—normal operation, or there were previously rolled back group operations, and this is the first stable group operation after roll back Each index file, LRT and IRT, may comprise key/value pointers to keys in LRT files and/or values in VRT files. When fixed size values are used, LRT value pointers may be implicit, e.g., sizeof(VRTFileHeader)+sizeof(value)*LRT-KeyIndex). FIG. 23A illustrates an example logical representation of an LRT file with implicit pointers.

Pointers within IRT files may be implicit if segments are referencing contiguous fixed size values or contiguous fixed sized keys. In this case, one explicit pointer is required for each contiguous segment. Defragmentation of LRT/VRT files is one way to produce contiguous values in VRT files and contiguous keys in LRT files. FIG. 23B illustrates an example logical representation of an IRT file with implicit pointers to contiguous, fixed length values, and FIG. 23C illustrates an example logical representation of an IRT file with contiguous, fixed length keys.

When values are of variable length, value pointers may be explicit. Specifically, for example, explicit value pointers may reference value locations within VRT files, and similarly, when referencing variable length keys.

IRT files may reference keys in LRT files. Key references may be used when primary keys cannot be derived from values and secondary indexes are being used. Key references may be used instead of, or in addition to, value references.

Figure 24:
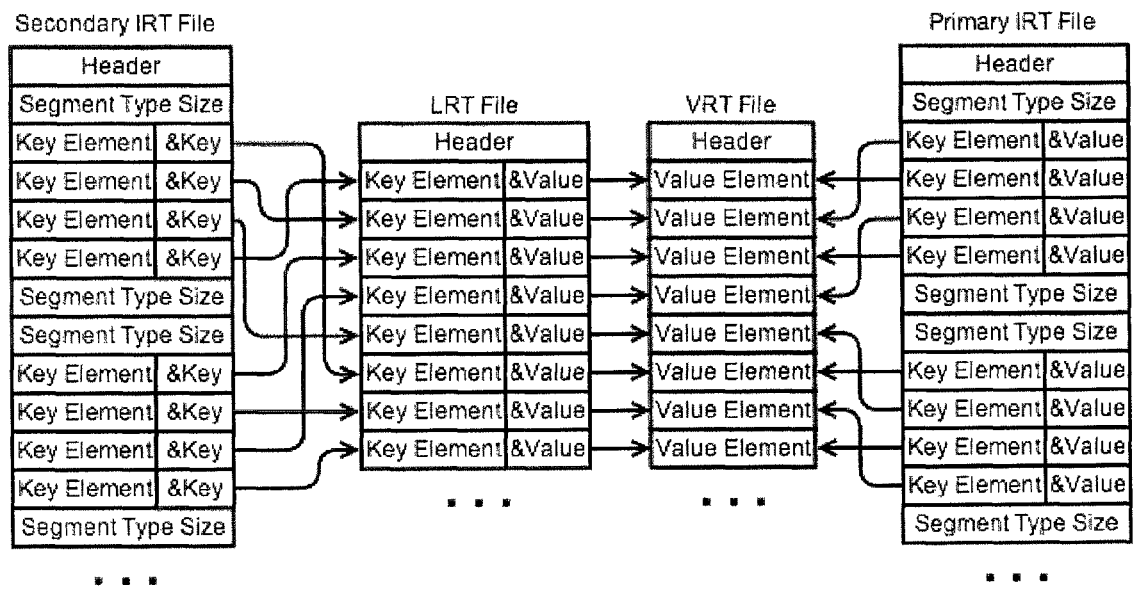
FIG. 24 illustrates an example logical representation of a secondary index in accordance with aspects of the present invention.

Secondary indexes may be both unique and non-unique and may be represented by additional IRT files. These secondary IRT files may reference values in existing VRT files and/or keys in LRT files. FIG. 24 illustrates an example logical representation of a secondary index.

Figure 25:
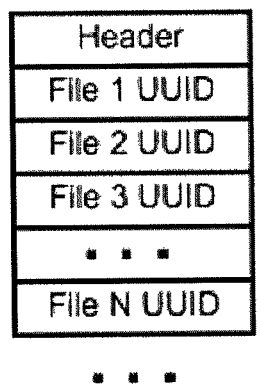
FIG. 25 illustrates an example logical representation of a file order meta-data file in accordance with aspects of the present invention.

Meta-data files may provide information about the datastore itself. For example, two major types of meta-data files may be used: (1) File Order Meta Data, and (2) Schema Meta Data. FIG. 25 illustrates an example logical representation of a file order meta-data file. File order meta-data may serve two main purposes, e.g., it can provide complete file ordering information, and/or as it provides complete file ordering information, it may be used for error detection and correction if files are missing. Schema meta-data may provide information about a datastore's schema in relation to LRT, VRT and IRT files.

Figure 26:
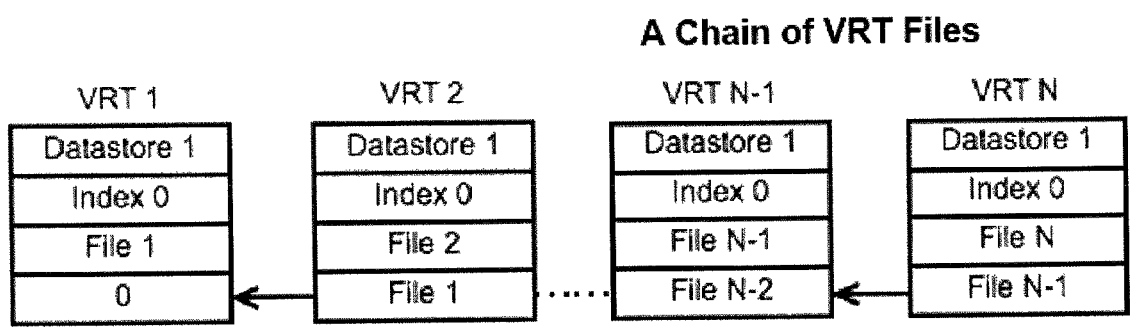
FIG. 26 illustrates an example logical representation of a chain of VRT files in accordance with aspects of the present invention.

As part of file management, when a maximum file size is reached, a new file may be created. This operation may produce a chain of related files composing the datastore. FIG. 26 illustrates an example chain of VRT files. Additionally, new files may be generated when schema changes arise that affect the size and shape of keys and values.

When a new file is generated, the file order meta-data file for the file chain may have the new file's UUID appended, and the new file may have its preceding file UUID set to the preceding file's UUID. Both operations may be append-only.

Figure 27A:
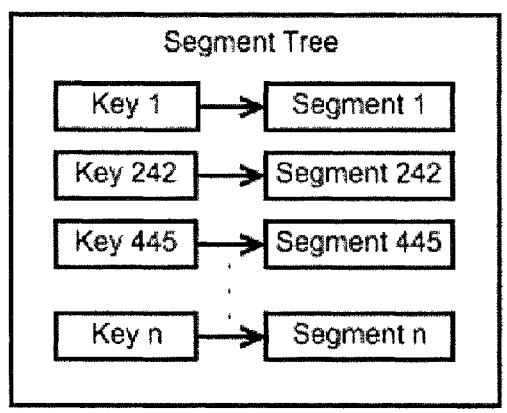
FIGS. 27A-C illustrate example logical representations of a segment tree, a cached segment 1 information tree, and a purged segment 1 information tree in accordance with aspects of the present invention.

On-disk indexes may need to be materialized in memory to be useful to programs. The principle indexing data structure in one example implementation of this system is a modified b+tree with high order buckets and binary bucket searches. Specifically, it is a key ordered tree of segments, where segments are key ordered trees of key/value structures (e.g. Information). FIG. 27A illustrates an example logical representation of a segment tree usable in accordance with aspects of the present invention.

Figure 27B:
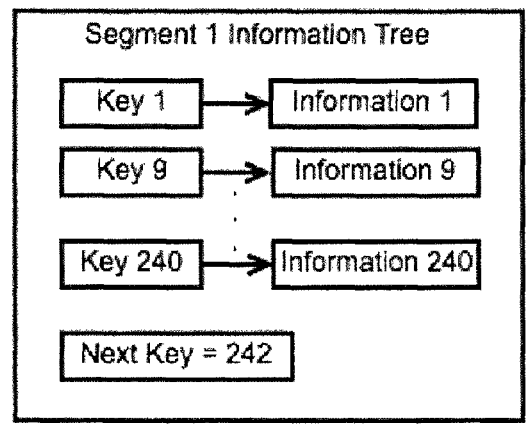

In this example the total key space spans 1 to n, segment 1 covers keys 1 to 241 and segment 242 covers keys 242 to 444. Key coverage for Segment 455 may not be determined precisely in this example, but it must be less than n. Segment n may contain keys to the end of the key space (e.g. infinity). Each segment may be both a place holder for the key space it covers and contain a cache holding key/value structures loaded from disk. FIG. 27B illustrates an example logical representation of a cached segment 1 information tree.

Figure 27C:
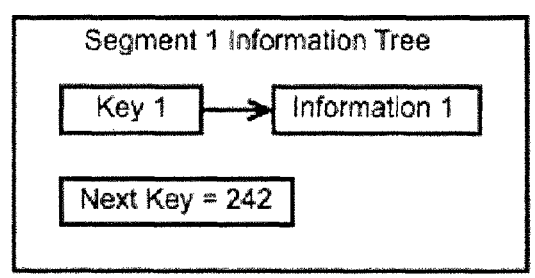

When memory pressure requires cached keys and values to be removed from memory, segments may be purged. FIG. 27C illustrates an example logical representation of a purged segment 1 information tree. Purged segments may comprise just enough information to allow them to be reconstructed from disk, for example. This information may include a reference to the file the segment was generated from and the location of the start of segment within the file.

Figure 28A:
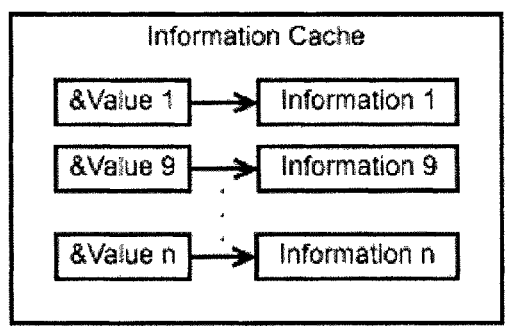
FIGS. 28A and 28B illustrate example logical representations of information caches in accordance with aspects of the present invention.
Figure 28B:
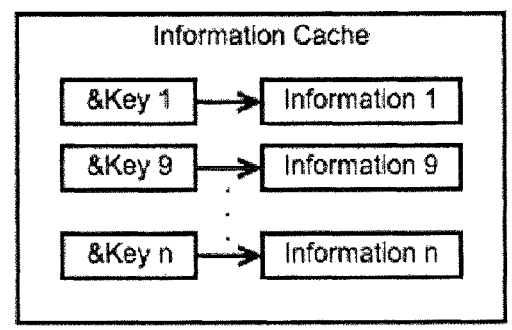

Secondary indexes may "point to" values managed under primary indexes. The in-memory representation of such indexes may be the same as or similar to those for primary indexes. Thus, secondary indexes may be composed of a segment tree, segments and information trees. Information objects may be shared between primary and secondary indexes. This capability may be provided, for example, to reduce memory utilization and ensure the same or a similar value is seen among all indexes. Information objects may be uniquely identified by primary key and/or their on-disk location in LRT or VRT files. Primary key identification may be useful, for example, in a single version datastore. LRT and VRT location may be useful in an MVCC datastore, for example, as it provides a unique version of the key and value. LRT and/or VRT location may be used to create a secondary key for information objects, for example. This secondary key may then be used as a MVCC cache for Information objects. Secondary indexes may be unique or non-unique. If non-unique, they may be made unique by appending a unique attribute. FIGS. 28A and 28B illustrate example information caches in accordance with aspects of the present invention.

The examples described supra assume a fully formed summary index. Fully formed summary indexes may be contiguous and cover the entire key space. When fully formed, a lookup for any key may have a definitive answer; for example, it is either present or not present. An example key space for an example of a fully formed summary index in accordance with aspects of the present invention is illustrated in FIG. 29A. In the example of FIG. 29A, the key space A-Z is represented. This key space of this example consists of segments 1-5, is sparse and has a max segment size of 3. The segment numbers are not present in the segments themselves; they are used here to identify segments during example discussions. A lookup for any key will return a definitive result in this example.

In some example implementations in accordance with aspects of the present invention, at least two cases may exist where fully formed summary indexes are not possible: (1) on system start-up, when in memory summary indexes must be built, and (2) when memory pressure demands purging of both segment information and segments. Thus, in-memory segments for these example implementations may need to represent incremental/incomplete indexes. This feature may be accomplished, for example, by indicating first and last segments, and indicating key space ranges within segments.

Given the above information, the example in FIG. 29A may be annotated as in FIG. 29B. With this additional information, incremental summary indexes may be built, and key lookups may fall into one of the following categories: present, not present, and unknown.

The example incremental summary index illustrated in FIG. 29C is missing segments. Although the exact missing segments are not known, the fact that there are missing segments may be determined from known segments. Two example cases (out of many) are shown in FIG. 29C. First, one or more segments are missing from the interior of the summary index (e.g. segment 2). Second, one or more segments are missing from the end of the summary index (e.g. segment 5). In both cases, missing segments may be detected by determining that the segment indicated by the next segment annotation does not exist. In case 1, E is not equal to G, and thus there are missing segments. In case 2, X is not equal to the next segment's start key since there is no next segment. Additionally, segment 4 does not indicate it is a Last segment even though it is at the end of the summary index, and thus there are missing segments following segment 4. Only one of these conditions needs to be detected to determine that there are missing segments at the end of the summary index. Similarly, if the first segment in the summary does not indicate it is first segments, segments are missing at the beginning of the summary index.

A key falling inside a missing segment space has an Unknown state (i.e., it is neither Present nor Not Present). In these cases, more of the summary index must be built before the Key's status can be determined.

When incremental indexing from disk is being performed, the status of unknown keys may be determined by reading more of the index file from disk, and building the summary index as segments are read. Once the key falls within a known segment's range, that segment may be loaded, and the exact status of the key may be determined.

Finally, a re-indexing operation may be complete when there are no missing segments (i.e., the key/segment space is contiguous).

In various examples in accordance with aspects of the present invention, composite keys are keys formed from a set of attributes. The order of attribute inclusion determines the natural order of the composite key. FIG. 30A illustrates an example relation requiring a composite primary key. No single attribute in this relation is unique, for this example. However, the combination of customerId and storeId produces a unique key that may be used as the relation's primary key. Two possible primary key attribute orders may exist in this example, (customerId, storeId) and (storeId, customerId). Both order choices may result in unique keys, but they may support different range queries. For example, (customerId, storeId) may enable efficient range queries by customer Id and then storeId, whereas (storeId, customerId) may enable efficient range queries by storeId and then customerId. Ordering key comparators by the key's attribute order may enable composite keys. Thus, the standard key comparator interface may be used, and its internal comparison operation may be a chain of key comparators.

Some previous data structures have assumed keys are unique and Information contains one and only one value associated with the key. When keys are non-unique, many values may be associated with a key. Many approaches may be used to handle non-unique keys. Whatever approach is used should be time and space efficient (both in-memory and on-disk), and as simple as possible. Ideally, the approach used should reuse as much of the existing code and algorithms as possible. Given these goals, a simple solution to the non-unique key problem may include transforming non-unique keys into unique keys. If all Information objects are assumed to have a unique primary key, the unique primary key may be used in combination with non-unique keys to create virtual, unique keys. In fact, any unique key within the relation may be used to transform non-unique keys to unique keys.

FIG. 30B illustrates an example relation with a non-unique secondary key isUp. This secondary key may be made unique by prepending or appending the primary key to its value. For example, both PrimaryKey.isUp and isUp.PrimaryKey may be unique. Appending the primary key may produce the following benefits: the index is naturally ordered by the non-unique key first and then the primary key, range queries over the non-unique key are performed by setting the primary key to start of range and end of range values, same valued non-unique keys are clustered together, and secondary indexes do not need to be updated unless their index value changes.

FIG. 31A illustrates an example logical representation of a BRT for non-unique keys, in accordance with aspects of the present invention.

However, when a primary key is used, MVCC may not automatically be supported. Another way to transform a non-unique key into a unique key may be to use the value's key or value file pointer, instead of the value's primary key. This approach may have the following advantages, for example: the value's key or value file pointer is a fixed size, and MVCC is automatically supported.

Although secondary indexes may need to be updated when a value changes, this may also be the case when MVCC is required and primary keys are used.

When a relatively small number of non-unique keys are used, BRT files may have large numbers composite keys starting with the same key value. Identifying key prefixes and encoding them once per segment may reduce this data redundancy.

FIG. 31B illustrates an example compressed BRT for non-unique keys, in accordance with aspects of the present invention.

Append-only operation may dramatically increase write performance and durability. New techniques and algorithms may be used to implement functionality and maximize performance. When information is naturally ordered during creation there may be no need for BRT file creation or maintenance. However, when information is created unordered anti-entropy algorithms may be required to increase read and lookup performance.

Anti-entropy algorithms (e.g., indexing, garbage collection and defragmentation) may work to restore order to "random" systems. Such operations may be parallelizable and take advantage of idle cores in multi-core systems. Thus, read performance may be regained at the expense of extra space and time (e.g. on disk indexes and background work). Over time, append-only files may become large and may need to be closed and possibly archived. At this point new LRT and VRT files may be created, and new entries may be written to the new files. An ordered, create only VRT file (e.g., a log file) may necessarily never be defragmented (since it is already ordered) but may be discarded. Old log files may typically be discarded first.

The LRT file may provide both key logging and indexing for the VRT file, while BRT files may provide an ordered index of VRT files. Forming an index may require an understanding of the type of keying and how the on-disk index files are organized.

LRT File Indexing

In some example implementations, all LRT files may be used as an index. However, ordered LRT files may be used directly and efficiently, while unordered LRT files must be used in their entirety (i.e., the entire file may necessarily be scanned, and an in-memory index created).

Keys within an LRT file may be ordered or unordered. Keys may also be unique or non-unique. This approach may lead to four ordering and uniqueness combinations: (1 Ordered Unique Keys, (2) Ordered Non-Unique Keys, (3) Unordered Unique Keys, and (4) Unordered Non-Unique Keys.

Immutable ordered keys/values (e.g., keys created in sequential order mapped to values that never change) may require only LRT indexes. In such cases, for example, sampling the ordered keys within the LRT may provide LRT summary indexing.

In some example variations in accordance with aspects of the present invention, key sampling may start at the beginning of the LRT file, reading the first key and building an in-memory segment for that key. This process may then be repeated by "skipping forward" segment size and obtaining the key at that location. Among other things, this method may build in in-memory summary index for the entire LRT file. When non-unique keys are present LRT, indexing may necessarily take contiguous equal keys into account. In such cases, "skipping forward" may necessarily identify a key change at each sampling point and use that change to define the segment boundary. LRT summary indexing may thereby be possible only when the LRT file is ordered. This constraint implies the LRT file may not contain key deletions, as those deletions may thereby create unordered keys. In such cases, IRT file indexing may be required. LRT file indexing may be possible, for example, in files with creation ordered keys/values that are never modified after creation.

IRT File Indexing

When unordered keys are created/modified/deleted, IRT file indexing may be required. IRT file indexing may restore order to the chaos generated by unordered key operations. IRT indexing may involve an anti-entropy algorithm.

IRT files may implement an efficient on-disk representation of ordered, contiguous collections of keys. This representation may enable fast and efficient creation of in-memory summary indexes (e.g., a lightweight modified b+tree).

An IRT file may be composed of segments. Segments within an IRT file may contain in-order contiguous keys. As keys are added, segments may be filled until they reach a write size threshold triggering a write to disk. Additionally, large segments may be split when they reach a split threshold, and small segments may be merged when they reach a merge threshold. In some variations, all segment writes may contain both the segment information and information about the operation performed to be used during incremental re-indexing.

In some example implementations, all segments may be written in append-only mode and record the last indexed position of the LRT/VRT file. This function allows indexing to resume from the last index location (instead of re-indexing the entire LRT/VRT file) in the event of failure. Furthermore, incomplete IRT writes may be detected when the last segment in the IRT file is incomplete, e.g., based on its segment size and/or other parameters. A per-segment CRC may also be used to detect segment completeness and corruption.

In some variations, segments previously written may be effectively pulled forward to the end of the file when modified. Thus, the keys of the segment may exist many times in the same file, but only the last, covering segment may be used for the index.

Additionally, since IRT files may provide order for unordered VRT files, IRTs may be used to impose order on LRT and VRT files themselves. In the above example, when a new segment is written, the LRT and VRT files may also be updated in the order defined by the segment. Over time, this approach may lead to LRT and VRT files with segment ordered, contiguous keys and values. This approach may also have the beneficial effect of ordering "hot spots" as they occur.

In-memory IRT summary indexes may be created by walking the segments of the IRT file backwards from its end. By definition, each later segment combination may necessarily contain a superset of keys in previously generated segments (e.g., later segments cover previous segments).

In some variations, previous segments with keys falling in the range of later segments may be discarded. Logically, the later segments may be the most recent version of the covered key space, and thus earlier segments in that key space may not be the current version.

Incremental IRT file re-indexing may be performed on-demand, based on key requests. Consider an example of an empty summary index and a request for a key (create, update or read). In this case, no index may be available, so re-indexing may necessarily start at the end of the last IRT file and run backwards through the file.

With a random key distribution, this initial case may require 50% of the IRT file to be scanned, on average, for example, before the key space for the key is found. Once scanned, the next random key may have a 50% chance (on average) of already being in the summary index, and if not in the index, on average 50% of the remaining IRT file may have to be scanned. Thus, successive scans may read less and less of the IRT, until the entire summary index is constructed. Contemporaneously, more and more of the summary index will thus have been created, so misses may become less and less likely. Summary segments thereby may reduce this worst case algorithm to an $O(\log(n))$ operation.

MVCC

Many summary indexes may coexist, each referencing previous versions of the datastore. This result may be possible, for example, due to the append-only nature of the files composing the datastore. Since the previous information may be immutable, it may thereby be re-indexed, and the state of the datastore reconstructed for any previous version.

In some example implementations, LRT/VRT files may include all transaction boundaries and stable states (e.g., after reorganization, to improve sequential access). Such files may be re-indexed to retrieve any prior version.

IRT indexes may behave differently. They may capture the index after every transaction, for example, or they may capture consolidated indexes containing the results of several transactions. Consolidated indexes may increase write performance dramatically, but they may not allow the state of the datastore after specific transactions to be recovered without consulting the LRT/VRT files.

When consolidated, the IRT may be providing the equivalent of a data store checkpoint. Since all segments in an IRT may reference the last indexed position of the LRT/VRT, they may indicate the results of all transactions up to that point in the LRT/VRT file. Reconstructing an intermediate version of the datastore after that point may be accomplished, for example, by playing the LRT/VRT transactions forward from the last indexed position.

Anti-Entropy

Append-only datastores with random key updates may suffer fragmentation (increasing entropy) and size growth over time. Ever increasing entropy may be combated via garbage collection and defragmentation, for example. Example aspects presented herein include four major opportunities for garbage collection and defragmentation: (1) as IRT segments are calculated and written, (2) when LRT and VRT files "roll-over" after reaching maximum size, (3) when cached segments are purged from the cache and (4) as a periodic background task running in idle intervals occurs.

New IRT segments may be calculated and written on a low priority, continuous basis as data is created, updated and deleted (case 1), for example. These segments may be used to re-order the LRT and VRT files or may simply reference the LRT/VRT data in-place. When files reach their maximum size, new files may be created to hold new updates (case 2) so that large numbers of segments written to the new file may be fully ordered. In the extreme, new LRT, VRT and IRT files may be created, and the entire datastore may be written fully ordered. When all entries in an LRT/VRT pair have been moved to new LRT/VRT files, for example, the original LRT/VRT files may be marked as Archive files. Archive files may be deleted as needed as all of the information they contain becomes stored elsewhere. When cached segments are purged from the cache (case 3), LRT/VRT files may be partially or fully reordered, based on the segment's current disorder. If all or most values are in-memory (implying seek/read has already been performed), for example, and those values were mostly unordered in the LRT/VRT files, it may be beneficial to reorder the LRT/VRT files, since the random read case has already been paid for.

Datastores may comprise collections of LRT, VRT and IRT files. Major datastore management operations may include creation, deletion, mounting and un-mounting.

A datastore may be created with options describing its intended use. These options may include, for example, Normal File Size or Extended File Size, Normal Key Size or Extended Key Size, Normal Value Size or Extended Value Size, Fixed Size Keys or Variable Sized Keys, Fixed Size Values or Variable Sized Value, Fixed Unsigned Integer or Variable Unsigned Integer Key and Value Length Encoding, (only useful when variable sized keys and/or values are specified), Unordered Keys or Ordered Keys, and Unique Keys or Non-Unique Keys. Datastores may comprise at least one LRT/VRT file pairing (the primary key) and may also have IRT files (in the case of unordered primary keys and secondary indexes). Secondary indexes may also be identified at creation time.

In some variations, when a datastore is deleted, all of its associated files may be deleted, and all data may be lost. Additionally, all in-memory data structures for the datastore may be cleared and/or deleted.

In some variations, a datastore may necessarily be mounted before it may be accessed. This approach allows datastores to exist without being accessed, for example. The mounting process may include Component Discovery, Error Detection and Correction, In-memory Summary Indexing.

Before a datastore may be mounted, its components may necessarily be discovered. A datastore's components may include the LRT, VRT, IRT and meta-data files that describe its structure and contain its indexes and data. To ease this process, every datastore file may be given a header that uniquely identifies the datastore, index and file, and specifies its type. Among other things, this approach may allow all datastore files to be identified without reliance on file naming conventions. Discovery may include scanning a set of files and producing collections of files that define datastores and indexes. Files with exactly matching datastore UUIDs may compose the same datastore, and files with matching index UUIDs may compose the same index.

Before a datastore is mounted it may be checked for errors and any errors found may be corrected. This approach ensures mounted datastores are error free during summary indexing.

When a datastore is mounted, an in-memory summary index may be created from its LRT and IRT files. This operation may require the mounting process to understand how to interpret and combine LRT and IRT file indexes. If a datastore is composed of ordered immutable keys only, LRT files may necessarily be present. The mounting process in this case may build the in-memory summary index from the LRT files using the process described in "LRT File Indexing".

A datastore composed of unordered keys may have both LRT files and IRT files. In this case, LRT files may be completely unordered, partially ordered or completely ordered. Note that LRT ordering may be imposed by IRT ordering. Thus, creating an index directly from LRTs may be possible, but inefficient (unless the LRT is known to be totally ordered, for example, in which case a IRT index for that file may not be needed).

It follows that in-memory summary indexes may need to be created from IRT files first. This may be accomplished by walking the IRT file backwards, similarly to as outlined in "IRT File Indexing". After the IRT summary index is created, LRT files may be examined. First, it is possible that IRT indexes may not contain all of the data from the LRTs. This determination is made by recording the "Last Indexed Position" for each LRT file, such as during IRT summary index generation. For each LRT file, if the last indexed position is not at its end, an in-memory summary index may be generated from the LRT file for the un-indexed items, starting directly after the last indexed position. In this way, all data in the LRT files may be indexed.

Finally, there may be fully ordered LRT files without associated IRT files (e.g., the files may have been created during defragmentation). Fully ordered LRT files may be added to the in-memory summary index, similarly to as described in "LRT File Indexing". Once in-memory summary indexing is complete, the datastore may be "mounted" and accessed by applications.

Un-mounting a datastore may include flushing all dirty in-memory indexes to disk, closing all associated files, clearing all associated data structures, and freeing all associated memory. Once un-mounting is completed, the data in the datastore may not be accessible to applications.

LRT, VRT and IRT files may be written to disk in append-only mode, greatly increasing durability. However, greatly increased durability may not eliminate errors, such as incomplete or inconsistent writes to disk. A mechanism may be provided to detect, and if possible, correct, these errors.

LRT/VRT file pairs may be written in lock step. In some variations, each LRT entry may map to one, and only one, VRT entry. Incomplete records may be present when the number of LRT entries is not equal to the number of VRT entries, or, for example, if the last entry in either or both files is not complete. When this occurs, there may be an incomplete record error. Correcting the incomplete record error may require the removal of the incomplete record (or records) from both the LRT and VRT files. Record removal may require the detection of the last complete record in each file. Once detected, the shortest run length of complete records from both files may be chosen, and all records after that point (complete or incomplete) may be discarded from both the LRT and VRT files. This process may result in files with equal numbers of complete entries.

When group operations are being used (e.g. transactions), detecting and discarding incomplete records may be necessary, but not sufficient. In this case, incomplete groups may also be discarded. Detecting incomplete groups may be accomplished, for example, by scanning backwards from the last complete record until either a group end or a group start flag is reached (checking for group end first). If a group end flag is reached, all records after the group end may be discarded. If a group start flag is reached, all records after and including the group start flag may be discarded. Discarding records in the LRT/VRT file may reduce the length of the files. This new length may provide an upper bound on value position encoded in IRT files. Rolling back all changes after the last value position may be accomplished by removing all IRT segments containing value positions after the last value position.

A IRT file may suffer an incomplete write. This error may be detected by scanning for well-formed segments, starting at the end of the IRT. A simple heuristic error checker, for example, may determine whether segment size at the end of the segment and the beginning of the segment must be equal, and if not, that there is corruption; when a per-segment CRC is present, it may be recalculated against the segment data, and if it does not match, it may be determined that there is an error; when segment sizes are equal the File UUID Index may be checked to determine if it references a valid file, and if not, it may be determined that there is an error; and when the File UUID Index is valid, the Last Indexed Position may be checked to determine if it falls within the indexed file, and if not, it may be determined that there is an error.

The above process may be repeated for up to T successful trials, where increasing T decreases the probability of false negatives (undetected errors).

When an IRT file error is detected, the error may be corrected by scanning for complete segments, starting at the beginning of the IRT file. This process may use the full segment error detection process described above, or it may use a subset of error detection checks, depending, for example, on speed and accuracy goals. For example, step 1 can be used until an error is detected, at which point the test may "back up" N segments and perform steps 2-4 to ensure the integrity of the last N segments.

Once the first segment with an error is detected, all data from that point in the file to its end may be removed. This approach may leave only complete, error free segments in the IRT file. Once error correction has been performed, the IRT file may have more or less segments than its associated LRT/VRT files, based on the Last Indexed Position of its segments. This approach thereby identifies the final error that must be detected and corrected. There are two possibilities: first, the IRT has indexed more data than is available in the LRT/VRT files (because, for example, those files were errored and have been corrected) or, second, the IRT file has indexed less data than is now available in LRT/VRT files— this is a "normal" case, where the remaining IRT file index may simply be generated from the LRT/VRT files.

When the IRT has indexed more data than is available in the LRT/VRT (case 1), those indexes may be removed from the IRT file. Maintaining the append-only invariant may require the removal of all segments after the earliest missing segment across all LRT/VRT files. This approach may remove valid indexes from the IRT from unaffected LRT/VRT files, but this approach may be acceptable, as those indexes may then be regenerated (case 2).

A database may be a collection of datastores.

Each datastore may be discovered by scanning the file system for data store files. The files composing a datastore may be discovered through datastore component discovery, for example. After discovery, each datastore may be presented as a named mount point. Data base management may control the inclusion or removal of data stores by inclusion or exclusion of mount points, for example.

Transactions group operations may be performed to produce atomic, isolated and serialize-able units. Two major types of transactions may be involved: transactions within a single datastore, and transactions spanning datastores. In some variations, all transactions may be formed in-memory (possibly with a disk cache for large transactions, for example) and may be flushed to disk upon commit. Thus, all information in LRT, VRT and IRT files may represent completed transactions. Once a transaction is committed to disk, the in-memory components of the datastore (e.g., the Active Segment Tree) may be updated as necessary. Committing to disk first, and then applying the changes to in the shared in-memory representation while still holding the transaction's locks, may enforce transactional semantics. Finally, all locks may be removed once the shared in-memory representation is updated.

Transactions may be formed in-memory before they are either committed or rolled back. Isolation may be maintained by ensuring transactions in process do not modify shared memory (i.e., the Active Segment Tree) until successfully committed.

Transactions within a datastore may be localized to, and managed by, that datastore. In some variations, all transactions may be initiated by a begin transaction request. A begin transaction request on a datastore may return a Transaction object associated with that datastore. Transaction objects may maintain the context for all operations performed within that transaction on its datastore. A Transaction object's context may comprise the transaction's ID and a Segment maintaining Key to Information bindings. This "scratch" segment may maintain a consolidated record of all "last" changes performed within the transaction. Such a segment may be "consolidated" because it is a Key to Information structure, where Information contains the last value change for a key.

As a transaction progresses, the keys it accesses and the values it modifies may be recorded in the Transaction object's Segment. Four example key/value access/update cases include (1) Created—this transaction created the key/value, (2) Read—this transaction read the key/value, (3) Updated—this transaction updated the key/value, and (4) Deleted—this transaction deleted the key/value.

In some variations, once a transaction accesses/updates a key/value, all subsequent accesses/updates for that key/value may be required to be performed on the Transaction object's Segment (i.e., it is isolated from the Active Segment Tree). Within a single transaction, the valid key/value state transitions for this example are illustrated in FIG. 32.

Maintaining the correct state for each entry may require appropriate lock acquisition and maintenance. The Read state minimally may require read lock acquisition, whereas the Created, Updated and Deleted states may require write lock acquisition, for example. Read locks may be promoted to write locks, but once a write occurs write locks may not be demoted to read locks in some variations.

Locks may exist at both the active Segment level and the key/value (Information) level. Adding a Key/Value to a Segment may require acquisition of a Segment lock (i.e. the Segment is being modified) and the creation of a placeholder Information object within the Active Segment Tree. Once an Information object exists, it may be used for key/value level locking and state bookkeeping.

Lock coupling may be used to obtain top-level Segment locks. Lightweight two phase locking may then be used for Segment and Information locking. Two phase locking may imply all locks for a transaction are acquired and held for the duration of the transaction. In some variations, locks may be released only after no further Information will be accessed (i.e., at Commit or Abort).

State bookkeeping enables the detection of transaction collisions and deadlocks. In some implementations, many transactions may read the same key/value, but only one transaction may write a key/value at a time. Furthermore, once a key/value has been read in a transaction it must not change during that transaction. If a second transaction writes to the key/value that a first transaction has read or written, for example, a transaction collision occurs.

In some variations, transaction collisions need to be avoided if possible. If avoidance is not possible, collisions may need to be detected and resolved. Collision resolution may involve blocking on locks to coordinate key/value access, deadlock detection and avoidance, and/or error reporting and transaction roll back, for example.

A successful transaction may be committed. When a transaction is committed, it may be written to disk VRT file first, then LRT file and possibly IRT file (IRT file writes can be asynchronous and are not required for durability). The Active Segment Tree may be updated with the Transaction's Segment. Associated bookkeeping may be updated. All acquired locks may be released.

An unsuccessful transaction may be aborted and rolled back. When a transaction is rolled back, associated bookkeeping may be updated. All acquired locks may be released. The Transaction's segment may be discarded. Transaction error reporting may be performed.

Database transactions may span datastores. Database transactions may span both local datastores and distributed datastores. Both such datastores may be treated the same or similarly. This similar/same treatment may be accomplished by using an atomic commitment protocol for both local and distributed transactions, for example. More specifically, an enhanced two-phase commit protocol may be used. All database transactions may be given a UUID that allows them to be uniquely identified without the need for distributed ID coordination (e.g. a Type 4 UUID). This transaction UUID may be carried between systems participating in the distributed transaction and stored in transaction logs.

Transactions written to disk may be delimited on disk to enable error correction. Transaction delineation may be performed both within and among datastores. Group delimiters may identify transactions within datastore files. Transactions among datastores may be identified by an append-only transaction log, referencing the transaction's groups within each datastore.

A datastore's LRT files may delimit groups using group start and group end flags. FIG. 33A illustrates an example such group delineation in LRT files.

Three group operations are shown in each LRT file in this example. In LRT A the first group operation affected keys (1, 2, 3), the second operation only affected key (10) and the third operation affected keys (2, 4) are as indicated. The indexes for the example operations in LRT A are 0, 3 and 4. A shorthand notation may be introduced for each group operation, e.g., Index=>tuple of affected keys. Using this notation, LRT B has three groups operations, 0=>(50, 70), 2=>(41, 42, 43) and 5=>(80).

A transaction log may be produced that contains entries identifying all of the components of the transaction. Such a log may be logically structured as illustrated in FIG. 33B, which shows an example logical layout of transaction log entries. Flags may indicate begin prepare transaction, end prepare transaction, and commit transaction. When a Begin transaction flag is set, UUID may be used as the transaction's ID, and the Size of the transaction may be specified. After the begin transaction (including the end transaction entry) the UUID may be the file UUID where the transaction group was written. When a file UUID is written, Position is the group start offset into that file. When the Committed transaction flag is set, UUID is the committed transaction's UUID and the Position indicates the position of the Begin transaction record within the transaction log.

FIG. 34 illustrates an example transaction log spanning LRTA and LRTB, in accordance with aspects of the present invention. The transaction log may provide an ordered record of all transactions across datastores. The log may also provide error detection and correction for transactions spanning data stores.

Errors may occur in any of the files of the datastore. The most common error, incomplete writes, may damage the last record(s) in a file. When this occurs, affected transactions may need to be detected and "rolled back". This operation may involve transactions within a single database or transactions spanning databases. Error detection and correction within a datastore may provide the last valid group operation Position within its LRT file. Given this LRT Position, any transactions within the transaction log after this position may need to be "rolled back", as the data for such transactions may have been lost. If the data for the transaction spans datastores, that transaction may need to be "rolled back" across datastores. In this case, the transaction log may indicate the datastores (by file UUID and Position) that must be rolled back.

Figure 3:
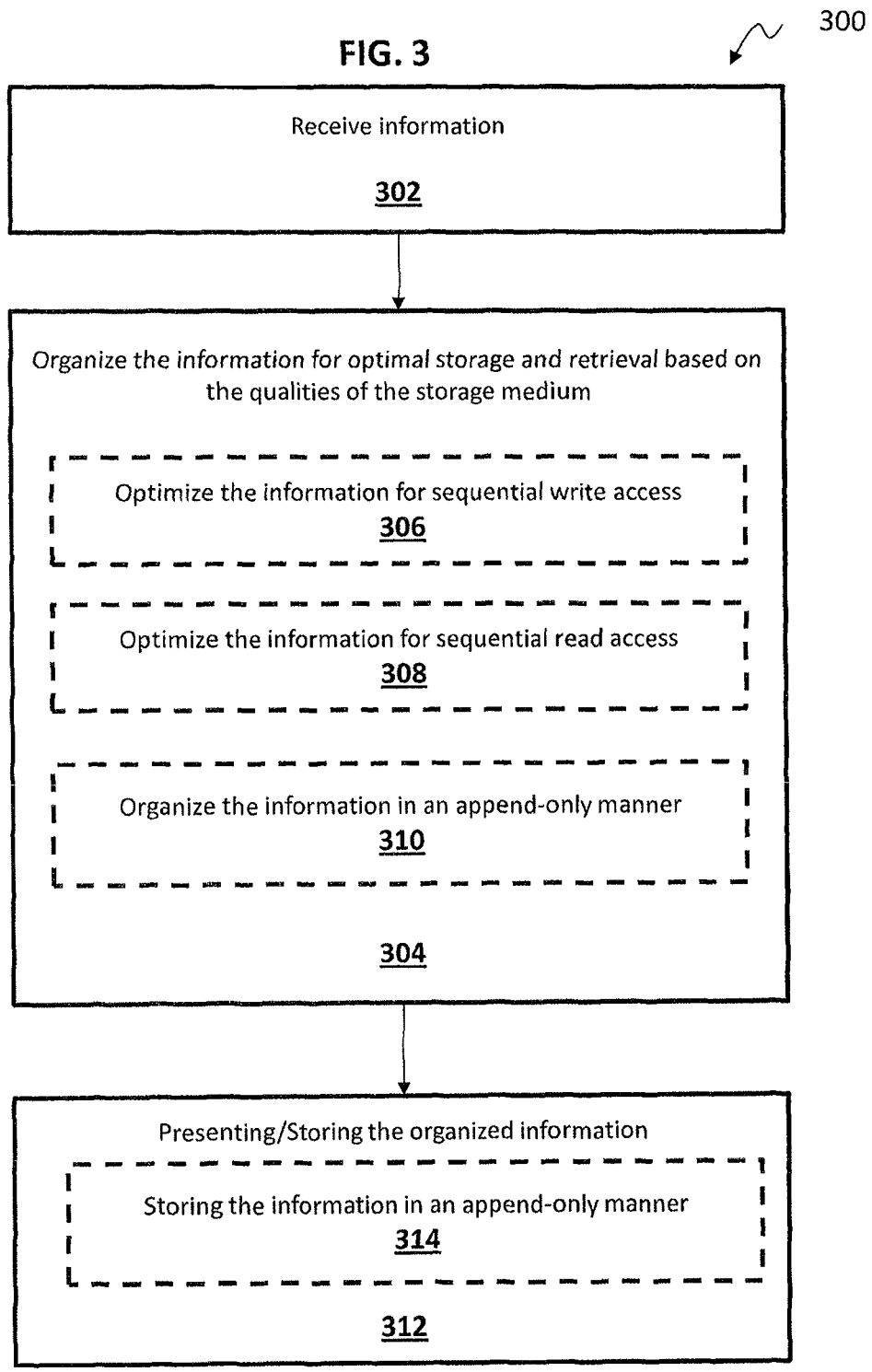
FIG. 3 illustrates a flow chart of retrieving and/or storing information in accordance with aspects of the present invention.

FIG. 3 presents a flow chart illustrating aspects of an automated method 300 of retrieving and/or storing information, in accordance with aspects of the presented herein. Information may be structured or unstructured and may include relations, objects, binary data and text. At 302, information is received. Information may be received in any automated manner, e.g., information may be received from user input, from web applications, from machine to machine communications, from a standard database or other data repository, file systems, event streams, sensors, network packets, etc. In an aspect, the receipt may be performed, e.g., by a communication component including any combination of processor 104, communication infrastructure 106, interface 120, communication interface 124, and communication path 126 in FIG. 1.

At 304, the received information is organized for optimal storage and/or retrieval based on the qualities of the storage medium. This may include any of, e.g., optimizing the information for sequential write access 306, optimizing the information for sequential read access 308, and organizing the information in an append-only manner 310. In an aspect, the organizing may be performed, e.g., by a processor, such as 104 in FIG. 1.

Then, at 312, the organized information is presented or stored. In an aspect, the storage may be performed, e.g., by any combination of processor 104, main memory 108, display interface 102, display unit 130, and secondary memory 110 described in connection with FIG. 1. For example, retrieved information may be presented by a standard query mechanism such as SQL relations, objects, binary data and text. The information may be stored, e.g., in transient memory or in a persistent form of memory. Persistent forms of memory include, e.g., any non-transitory computer readable medium, such as tape, disk, flash memory or battery backed RAM. Storage may include storing the organized information in an append-only manner 314. An in-memory representation of the information may be different from a non-transient storage of information. For example, the in-memory representation of information may be optimized independently from the non-transient storage of information, and both representations may be optimized for their respective mediums.

An append only manner may include, e.g., only writing data to the end of each file. Append-only metadata files, e.g., may represent information about the datastore itself and/or file order and schema.

Non-transient information may be stored in files prefaced by append-only headers describing at least one of the file's format, datastore membership, index membership, file identifier and preceding file identifier used for append only file chaining. The header may describe the file's format. The description may include a flag, a file type, an encoding type, a header length and/or header data.

The information may be, e.g., streamed to and from non-transient mediums. Example aspects of streaming are described in connection with FIG. 13.

The information may be created, read, updated and/or deleted as key/value pairs. Keys and values may be fixed length or variable length. Alternatively, the information may be created, read, updated and/or deleted concurrently.

The information may be stored, e.g., at 312, in variable length segments. The segment length may be determined based on policy, optimization of central processing unit memory, and/or optimization of input and output.

The segments may be summarized and hierarchical.

The segments may comprise metadata, the segment metadata being hierarchical. Such segment metadata may include any of computed information related to the information comprised within segments and segment summaries, error detection and correction information, statistical and aggregated information used for internal optimizations including but not limited to defragmentation, statistical and aggregated information used for external optimizations including but not limited to query optimizations, information representing data consistency aspects of segments, information representing physical aspects of the segments, information representing aggregations of segment information, and information generated automatically in the response to queries and query patterns.

The segments may be purged from memory based on memory pressure and/or policy. Additional aspects of purging are illustrated in connection with FIG. 14.

The segments may be split into multiple segments based on size and/or policy. The segments may be merged based on at least one of size and policy.

The segments may be compact or compressed.

When a segment comprises a compact segment, such compaction may be achieved by identifying longest matching key prefixes and subsequently storing the longest matching key prefixes once followed by each matching key represented by its suffix. There may be longest matching prefixes per segment and those prefixes may be chosen so as to optimize one or more characteristics, e.g., including CPU utilization and segment size.

The segments may comprise error detecting and correcting code.

Variable length segments may be stored on non-transient storage within append-only files which are limited in size and chained together through previous file identifiers in their headers. Such variable length segments may be generalized indexes into the state log of key/value pairs.

The segments may be stored by key and ordered by key in a segment tree and/or an information tree. When segments are stored by key and ordered by key in a segment tree, the segments may be purged from memory to non-transient storage and loaded from non-transient storage into memory.

The segment information may be stored in an information cache. Such stored information may be shared by segments representing primary and secondary indexes.

LRT files and VRT files, e.g., may comprise a generalized state log. The state log may include state, flags and/or an indication of operations and group boundaries. The groups may be variable sized and indicate group operations including at least one of transactions and defragmentation. The groups may be compressed groups. The groups may include error detecting and correcting code.

When the information is created, read, updated and/or deleted as key/value pairs, keys and values may be represented by key elements and value elements, the key elements and value elements being encoded using at least one of a state flag, a fixed size encoding, a size delimited variable size encoding, and a framed variable length encoding. The keys, values, key elements and value elements may be referenced by key pointers and value pointers. The key pointers and value pointers may be fixed length or variable length.

The key pointers and value pointers may be implicit, when referencing fixed length keys and values. The key pointers and value pointer may be explicit, when referencing variable length keys and values.

When the information is created, read, updated and/or deleted as key/value pairs, of a create, a read, an update and/or a delete operation on such key/value pairs may drive primary and secondary indexing. The keys used in primary and secondary indexing may comprise a composite key. The keys used in primary and secondary indexing may comprise a non-unique key. The keys may be derived from both the key part and value part of key/value pairs.

Unique information may be identified by key and value pointers and those pointers may identify, e.g., instances in time as well as space, thereby enabling Multi Version Concurrency Control (MVCC). Such segments may comprise said unique key and value pointers thereby supporting MVCC primary and secondary indexes.

Aspects may further include an automated system for storing and retrieving information, the system including means for receiving information, means for organizing said information for optimal storage and retrieval based on the qualities of a storage medium, and means for, at least one of, presenting and storing said organized information. Examples of such means for receiving, means for organizing, and means for presenting and storing are, e.g., described in connection with FIGS. 1 and 2.

Aspects may further include a computer program product comprising a computer readable medium having control logic stored therein for causing a computer to perform storage and retrieval of information, the control logic code for performing the aspects described in connection with FIGS. 3-19. For example, the control logic may cause a computer to perform receiving information, organizing said information for optimal storage and retrieval based on the qualities of a storage medium, and at least one of presenting and storing said organized information, as described herein.

Asepcts may further include an automated system for the storage and retrieval of information. The system may include, e.g., at least one processor, a user interface functioning via the at least one processor, and a repository accessible by the at least one processor. The processor may be configured to perform any of the aspects described in connection with FIGS. 3-19. The processor may be configured, e.g., to receive information, organize said information for optimal storage and retrieval based on the qualities of a storage medium, and at least one of present and store said organized information.

Figure 4:
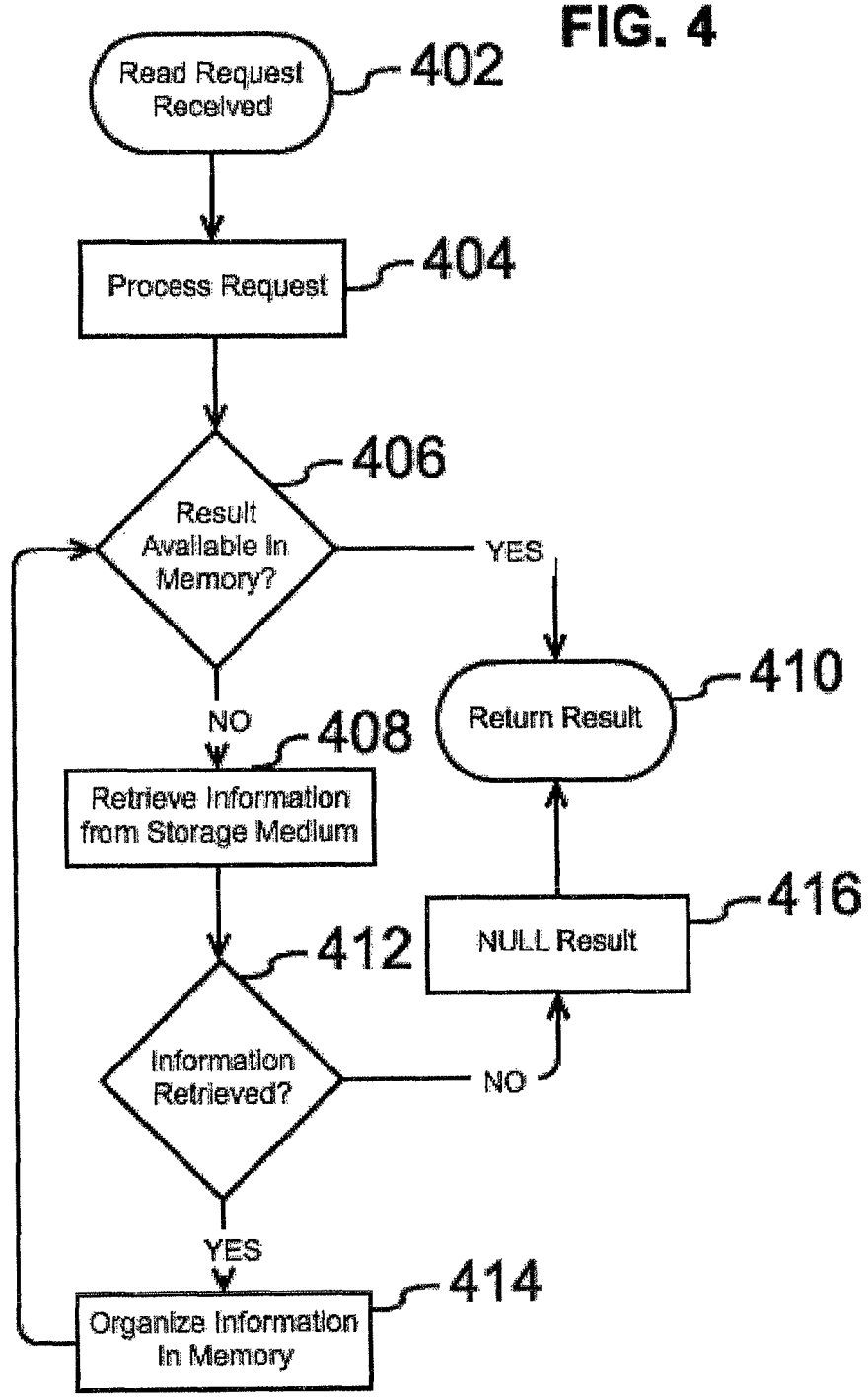
FIG. 4 illustrates a flow chart of receiving and processing read requests for information in accordance with aspects of the present invention.

FIG. 4 presents a flow chart illustrating aspects of an automated method 400 of receiving 402 and processing 404 read requests for information where that information may be present in main memory or on a storage medium in an append-only manner. When information and results are not available at 406, information is incrementally retrieved from the storage medium from append-only data structures in 408. When information is retrieved, that information is organized in memory at 414 and memory is rechecked for results at 406. The process continues until results are found at 406 or no further information may be retrieved as determined by 412. When no results are found a NULL return result is set in 416.

Efficient incremental retrieval of information is directed by indexes which are incrementally regenerated from the storage medium where they were stored in an append-only manner.

Figure 5:
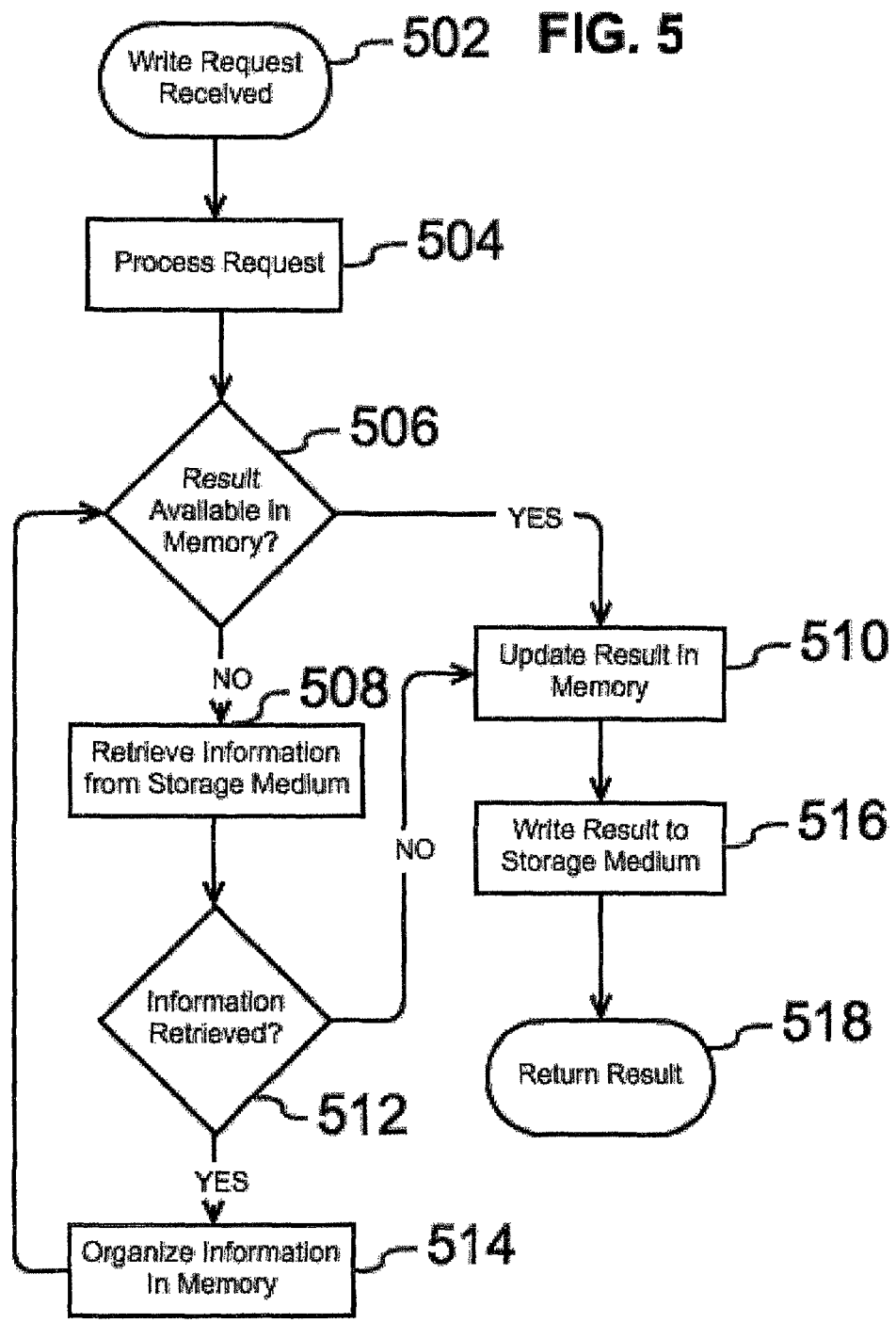
FIG. 5 illustrates a flow chart of receiving and processing write requests for information in accordance with aspects of the present invention.

FIG. 5 presents a flow chart illustrating aspects of an automated method 500 of receiving 502 and processing 504 write requests for information where that information may be present in main memory or on a storage medium in an append-only manner. When a write request is received main memory is checked in 506 to determine if that result is already available in main memory. If the result is not available in main memory information is incrementally retrieved from the storage medium from append only structures in 508. When information is retrieved, that information is organized (e.g. ordered) in memory (i.e. segments) at 514 and memory is rechecked for results at 506. The process continues until results are found at 506 or no further information may be retrieved as determined by 512. In either case, the write result is updated in memory at 510, written to the storage medium at 516 and returned at 518.

Figure 6:
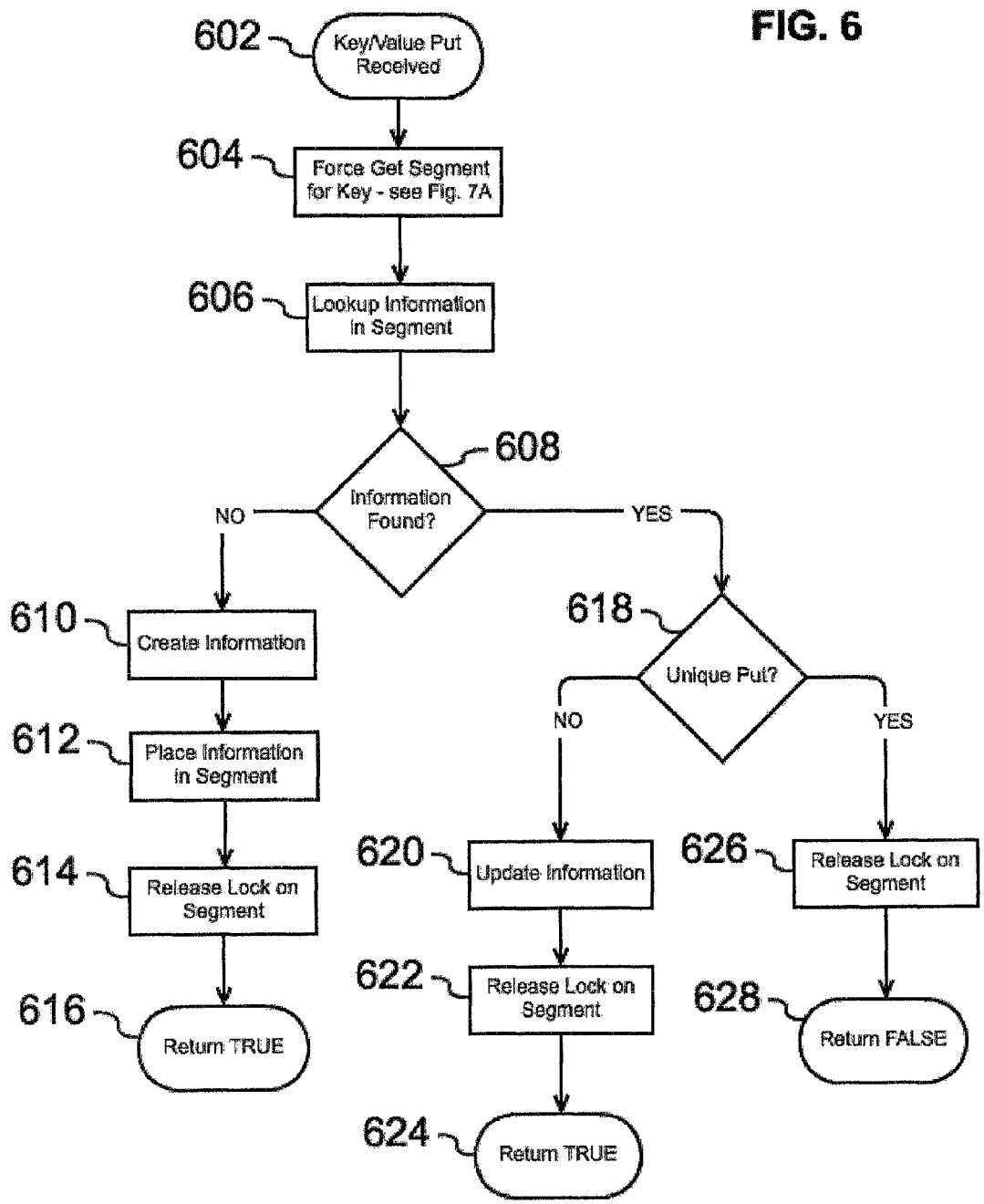
FIG. 6 illustrates a flow chart of receiving a information write request in accordance with aspects of the present invention.

FIG. 6 presents a flow chart illustrating aspects of an automated method 600 of receiving an information write request in the form of a key/value put at 602. When a key/value put is received the segment for the key is looked up or created in 604 using a forced get request. Once the segment is found or created the information for the key is retrieved in 606 and if not found as determined in 608 the information for the key/value put is created in 610 and placed in the segment at 612. Finally, the segment lock is released at 614 and the successful put is indicated by returning TRUE at 616.

If the information for the key/value was found at 608 a further check is done at 618 to determine if this is a unique put. If this is a non-unique put the found information is updated in 620, the segment lock is released in 622 and returning TRUE at 624 indicates the successful put. If a unique put was indicated at 618 the segment lock is released at 626 and FALSE is returned 628 indicating an unsuccessful put.

Figure 7:
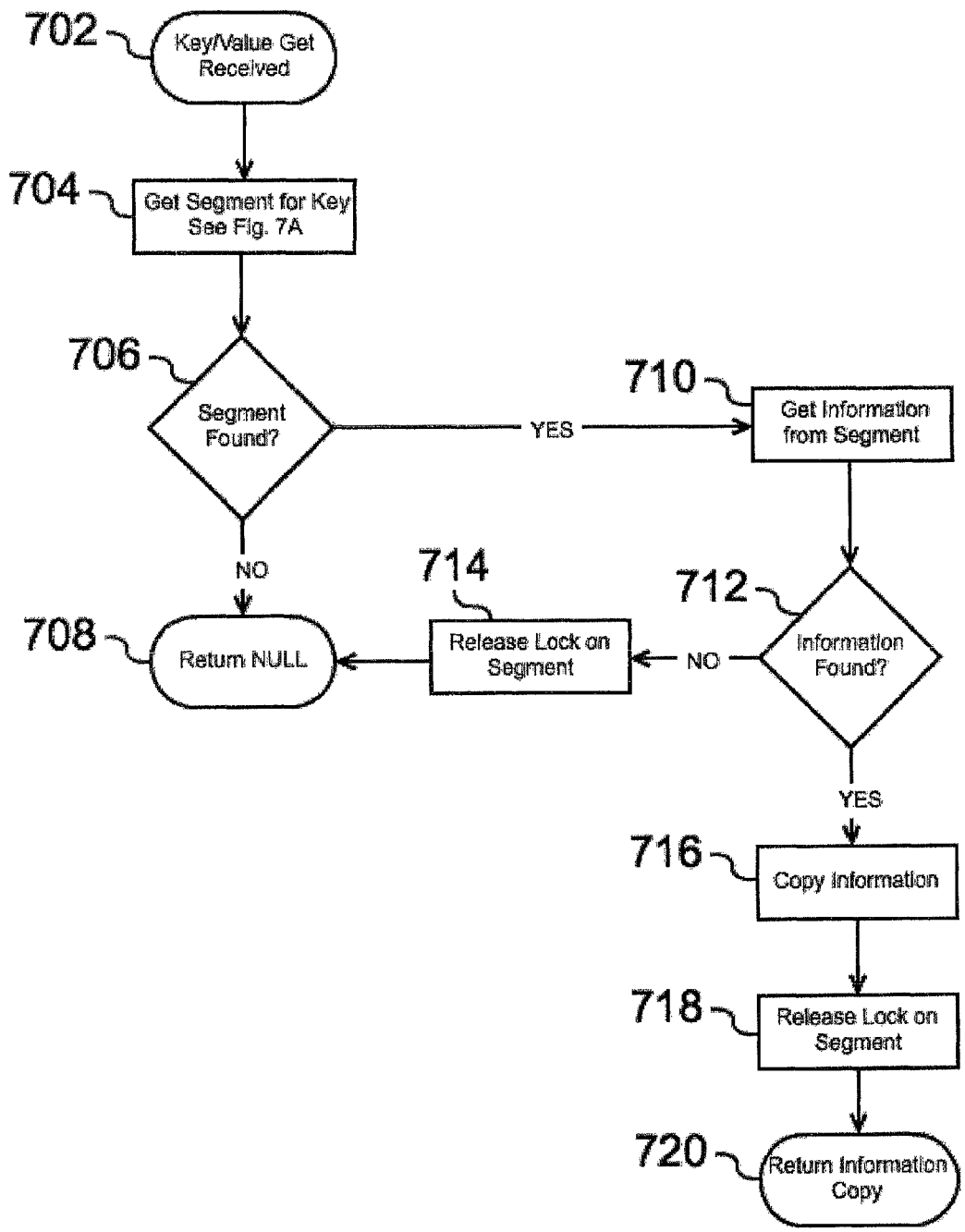
FIG. 7 illustrates a flow chart of information read request in accordance with aspects of the present invention.

FIG. 7 presents a flow chart illustrating aspects of an automated method 700 of receiving an information read request in the form of a key/value get at 702. When a key/value get is received the segment for the key is looked up in 704 (see FIG. 7A) and if not found as determined at 706 NULL is returned at 708. If a segment is found at 706, the information for the key is retrieved from the segment at 710. If the information for the key is found at 712 the information is copied at 716, the segment lock is released at 718 and the information copy is returned at 720. If the information was not found at 712 the segment lock is released at 714 and NULL is returned at 708.

Figure 7A:
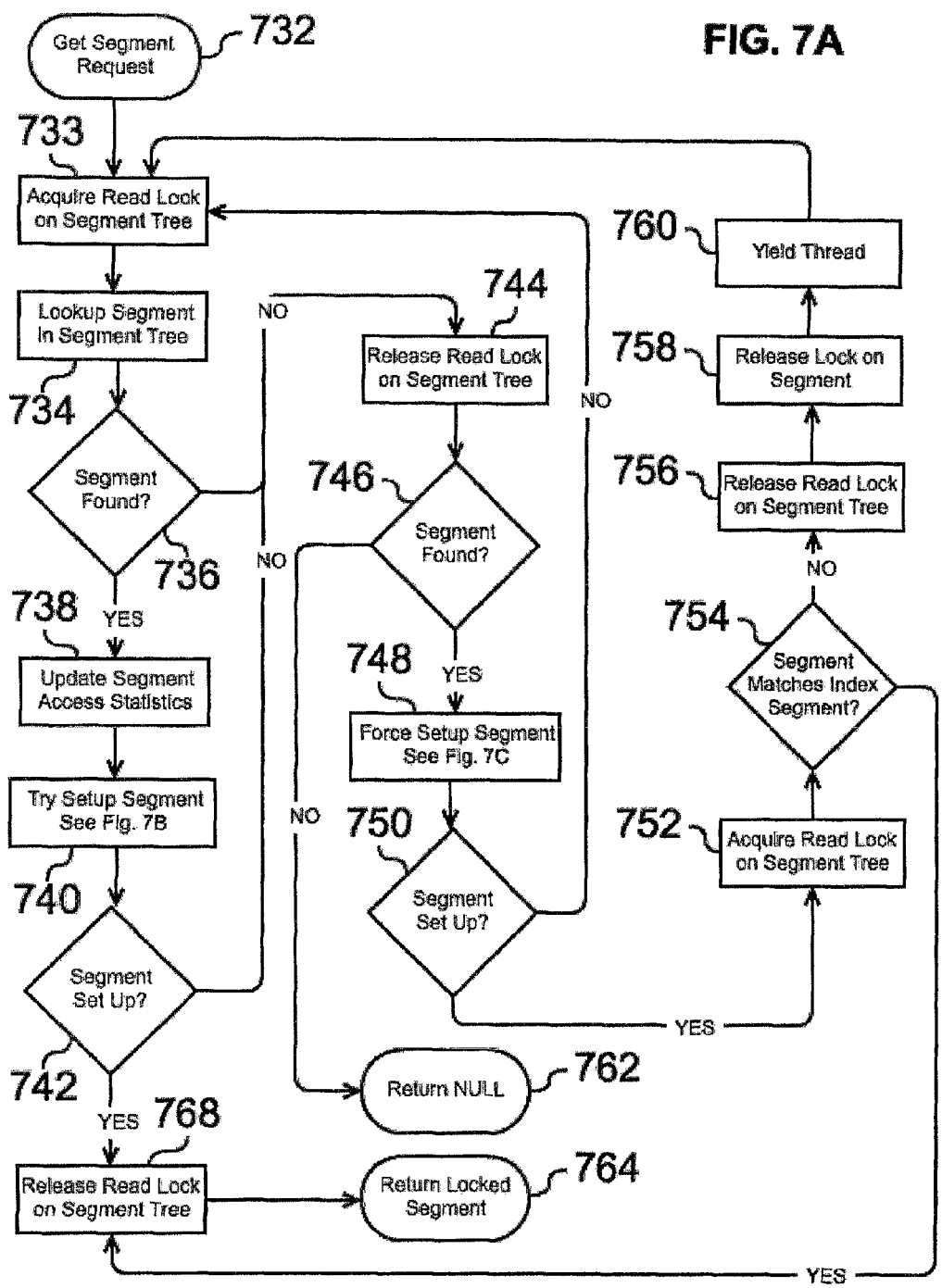
FIG. 7A illustrates a flow chart of receiving and processing a get segment request in accordance with aspects of the present invention.

FIG. 7A presents a flow chart illustrating aspects of an automated method 730 of receiving a get segment request at 732 and processing that request to return a segment when appropriate. Upon receiving a get segment request at 732 a read lock is acquired on the segment tree at 733 and the segment is looked up in the segment tree in 734. If the segment is found its access statistics are updated at 738 and an attempt is made to setup the segment in 740 (see FIG. 7B). At 742 the segment is checked to determine if it was setup and if it was the read lock on the segment tree is release at 768 and the locked segment is returned at 764.

If the segment was not found at 736 or the segment was not setup at 742 the read lock on the segment tree is released at 744. If the segment was not found in 746, NULL is returned. Otherwise, the segment was found and an attempt is made to set it up in 748 (see FIG. 7C). If the segment was not setup as determined by 750 the process is retried starting at 733. If the segment was set up at 750 the segment tree's read lock is acquired at 752 and the segment is checked at 754 to determine if it still matches the index segment. If the segment matches the index segment the segment tree read lock is released at 768 and the locked segment is returned at 764.

If the segment did not match the index segment at 754 the segment tree read lock is released at 756 and the segment lock is released at 758. The current thread is yielded at 760 to allow other threads to run before the process is retried staring at 733.

Figure 7B:
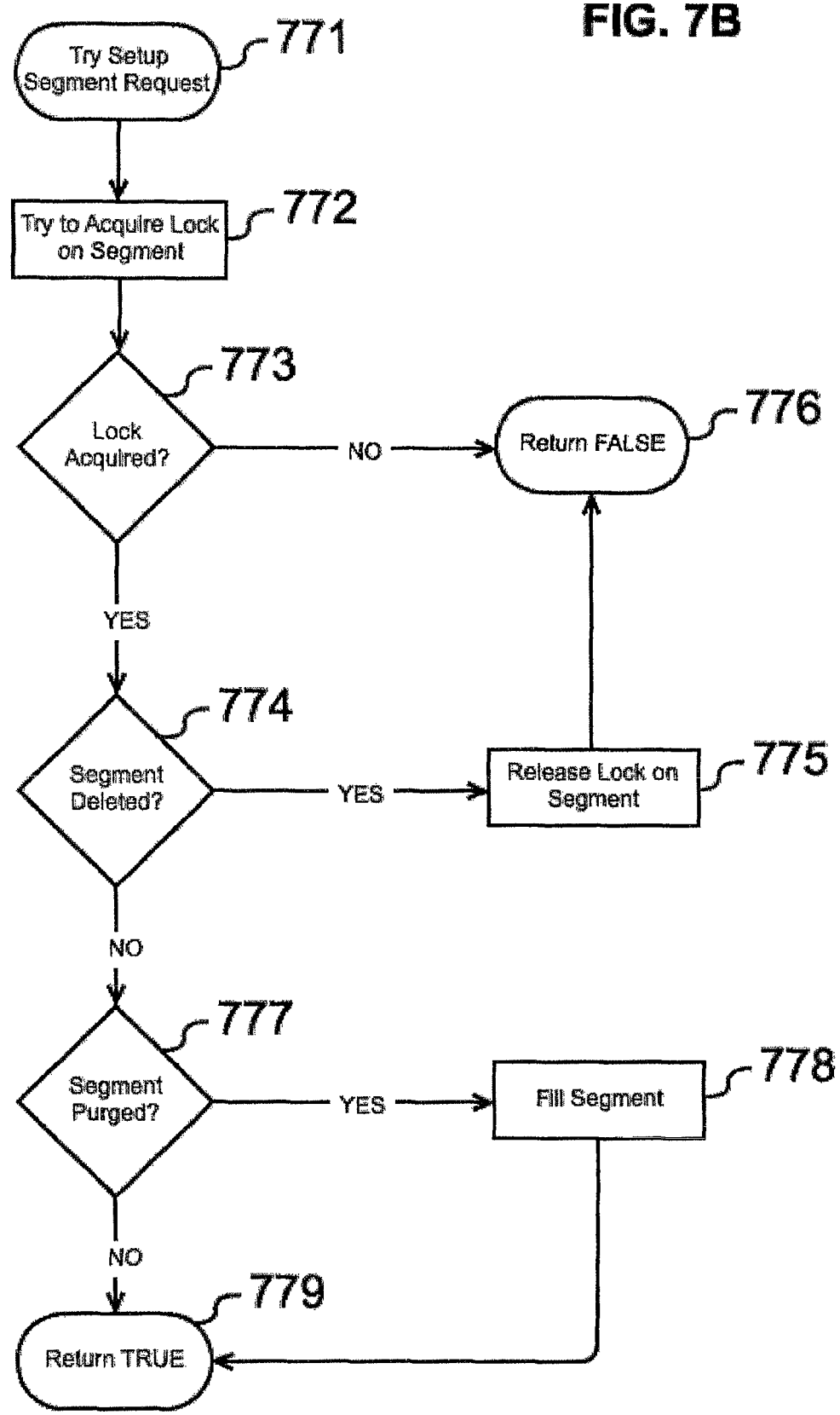
FIG. 7B illustrates a flow chart of receiving and processing a try setup segment request in accordance with aspects of the present invention.

FIG. 7B presents a flow chart illustrating aspects of an automated method 770 of receiving a try setup segment request at 771 and processing that request. At 772 an attempt is made to acquire the lock on the segment and if the lock is acquired at 773 the segment is checked for deletion at 774. If the segment is not deleted it is checked to determine if it is purged at 777 and if not purged TRUE is returned.

If the lock was not acquired at 773 FALSE is returned at 776. If the segment was deleted at 774 the segment lock is released at 775 and FALSE is returned at 776. Finally, if the segment was purged at 777 the segment is filled at 778 and TRUE is returned.

FIG. 7C presents a flow chart illustrating aspects of an automated method 780 of receiving a force segment setup request at 781 and processing that request. At 782 a segment lock is acquired and at 783 the segment is checked for deletion. If the segment is deleted the segment lock is released at 784 and NULL is returned at 785. If the segment is not deleted it is checked to see if it is purged at 786 and if it is purged it is filled at 787. Once filled in 787 or if not purged at 786 the locked segment is returned at 788.

Figure 8:
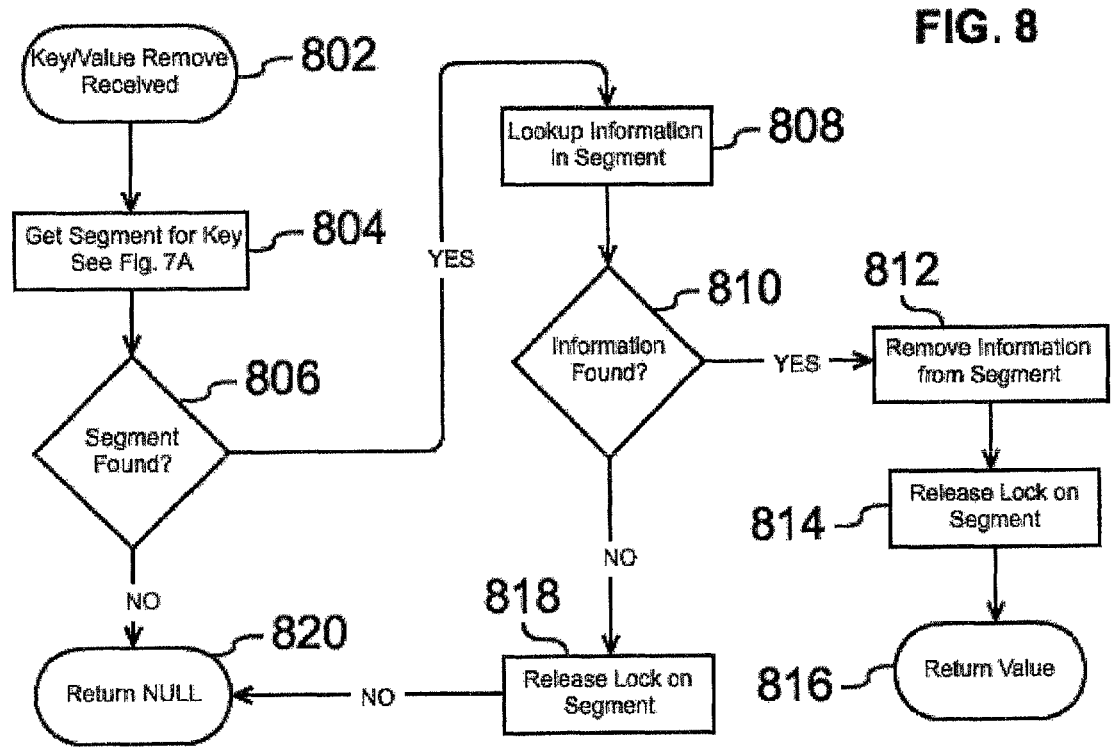
FIG. 8 illustrates a flow chart of receiving and processing a information write request in accordance with aspects of the present invention.

FIG. 8 presents a flow chart illustrating aspects of an automated method 800 of receiving an information write request in the form of a key/value remove at 802. When a key/value remove is received the segment for the key is looked up in 804 (see FIG. 7A) and if not found as determined at 806 NULL is returned at 820. If a segment is found at 806 the information for the key is looked up in the segment in 808. If the information for the key is found at 810 the information is removed from the segment in 812, the segment lock is released at 814 and the value is returned at 816. If information was not found at 810 the segment lock is released at 818 and NULL is returned at 820.

Figure 9:
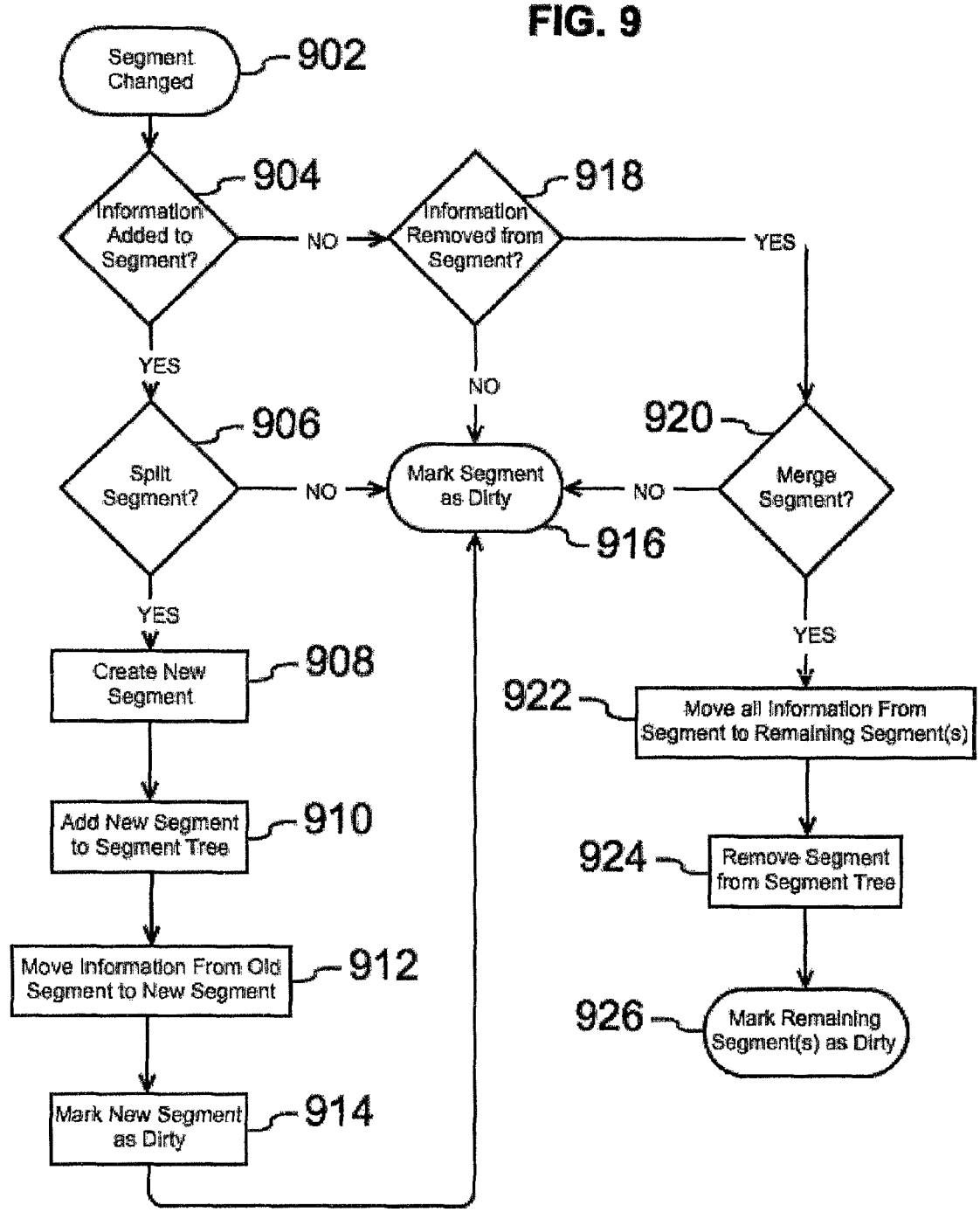
FIG. 9 illustrates a flow chart of handling segment changes in accordance with aspects of the present invention.

FIG. 9 presents a flow chart illustrating aspects of an automated method 900 of handling segment changes starting at 902. A segment changes when information is added to it, checked at 904, or is removed from it, checked at 918. When information is added to a segment that segment may need to be split in 906 based on segment size and statistics. If the segment is split a new segment is created in 908 and that new segment is added to the segment tree in 910. After creation and insertion the new segment is filled with a percentage of the information from the old segment by moving that information from the old segment to the new segment in

912. The new segment is then marked as dirty at 914 and the old segment is marked as dirty at 916.

If information was not added to the segment a check is done at 918 to determine if information was removed from the segment. If information was not removed from the segment the segment is marked as dirty in 916. When enough information is removed from a segment, as determined by thresholds and statistics in 920, the segment may be merged with adjacent segments. When a segment is merged all of its information is moved into one or more remaining segments in 922 and the emptied segment is removed from the segment tree in 924. Finally, the remaining segments accepting the merged information are marked as dirty in 926.

Figure 10:
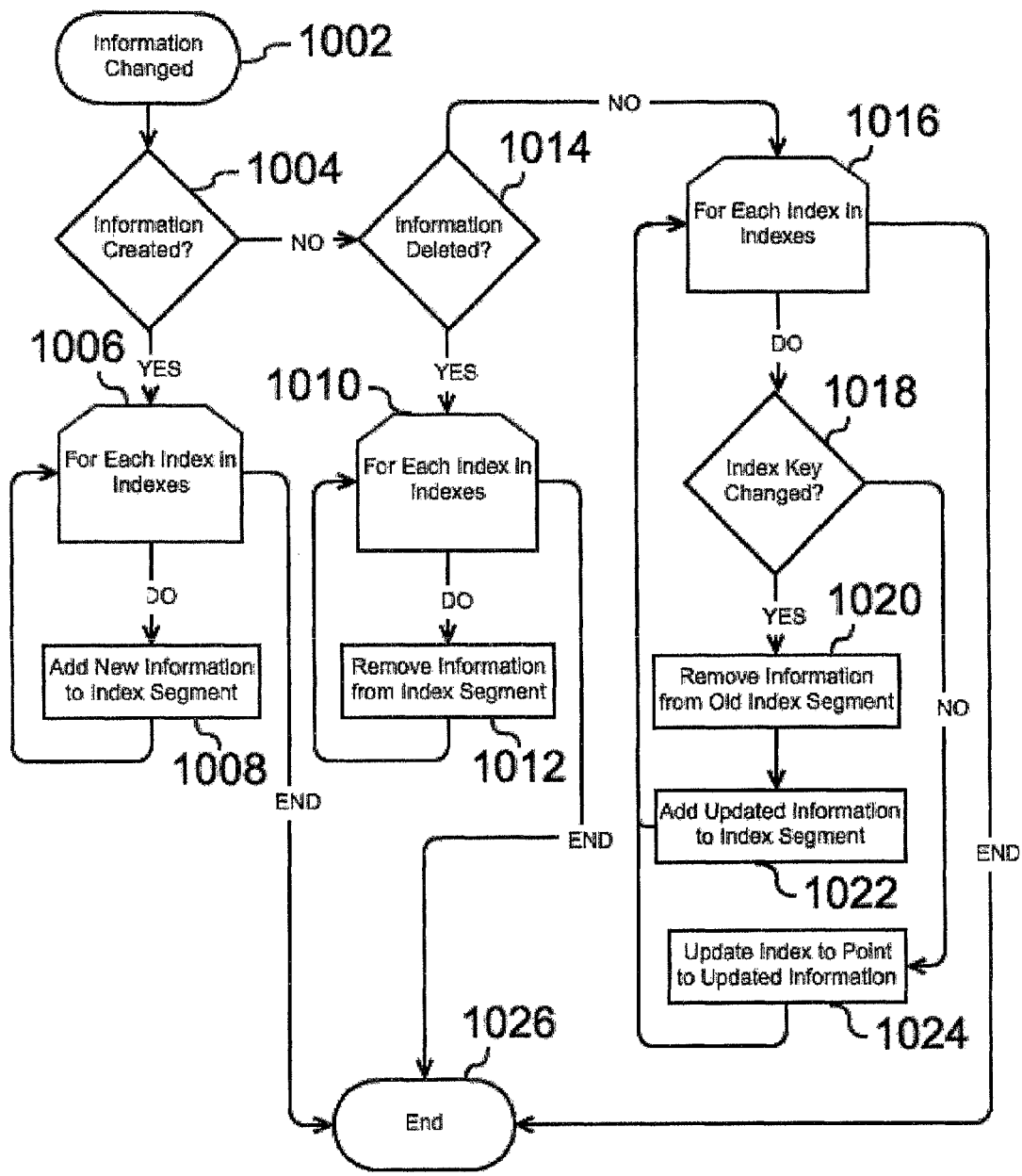
FIG. 10 illustrates a flow chart of handling index update propagation in accordance with aspects of the present invention.

FIG. 10 presents a flow chart illustrating aspects of an automated method 1000 of handling index update propagation upon information changes staring at 1002. At 1004 a check is done to see if information was created and if it was each index is traversed in 1006 and the newly created information is added to each index segment at 1008. Once all indexes have been traversed the process ends at 1026.

If information was not created a check is done at 1014 to determine if information was deleted. If information was deleted each index is traversed and the deleted information is removed from each index segment at 1012. Once all indexes have been traversed the process ends at 1026.

If information has changed but was not created or deleted it has been updated. Each index is traversed in 1016 and each index key is checked to determine if it has changed in 1018. If the index key has not changed the index is updated to point to the updated information in 1024. If the index key has changed the updated information is removed from the old segment in 1020 and is added to the index segment in 1022. Once all indexes have been traversed the process ends at 1026.

FIG. 11 presents a flow chart illustrating aspects of an automated method 1100 of information caching in response to information get requests starting at 1102. At 1104 if information is determined to be in the information cache information access statistics are updated in 1106 and the information is returned at 1122. If the requested information is not found in the cache it is retrieved from the storage medium in 1108. If the requested information is not found at 1110, NULL is returned in 1120. Otherwise the cache size is checked at 1112 and if it has been exceeded indexes are streamed to the storage medium in 1116 and then information is purged based on policy and statistics in 1118. If the cache size was not exceeded or a purge cycle is completed the found information is placed in the cache at 1114. Once the information is placed in the cache the information access statistics are updated at 1106 and the information is returned at 1122.

Figure 12A:
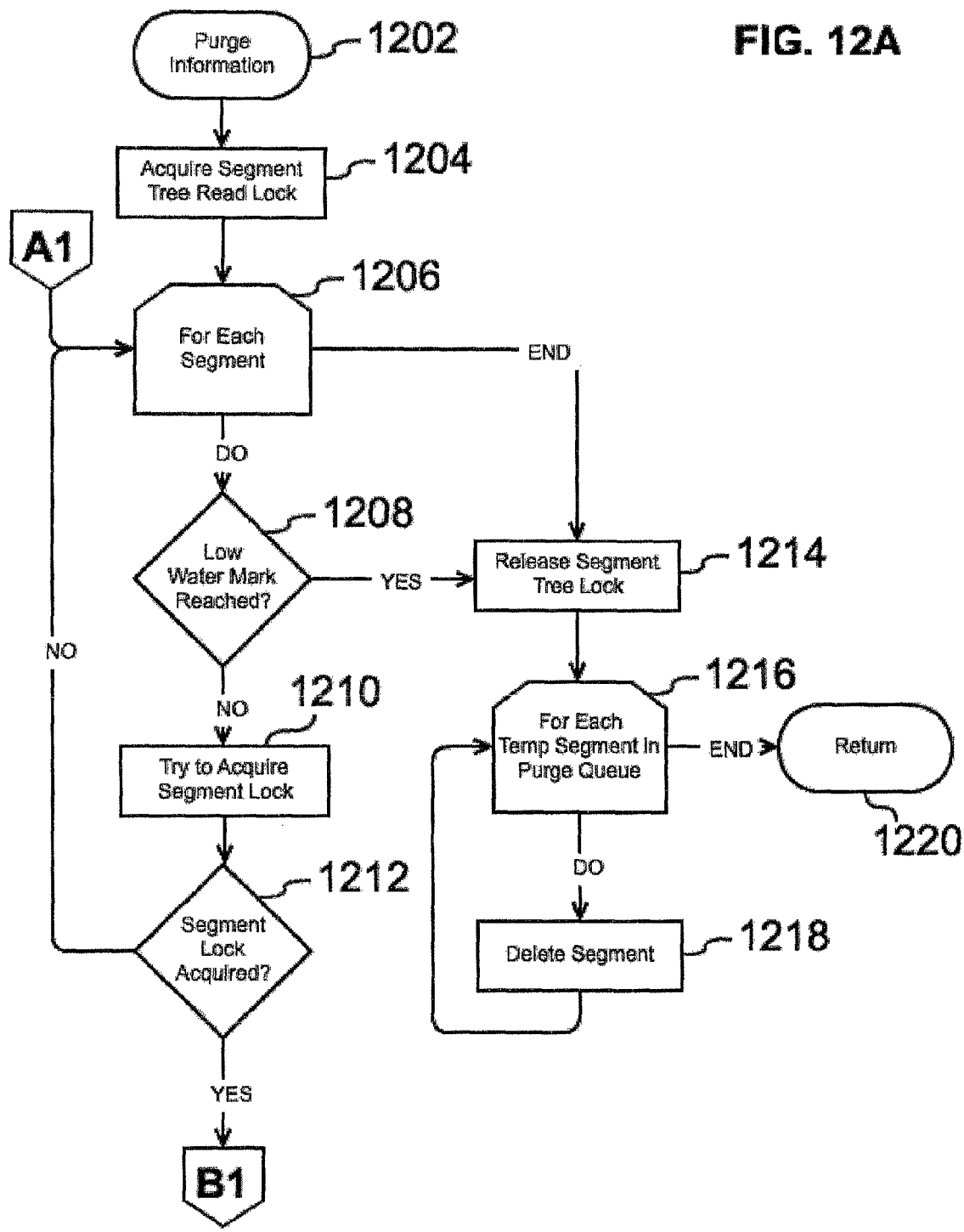

FIGS. 12A and 12B present flow charts illustrating aspects of an automated method 1200 of memory management and information purging starting at 1202. When information must be purged to free up memory segments the segment tree read lock is acquired at 1204 and segments are ordered for deletion by policy (e.g. least recently used) starting at 1206. At 1206 each segment is traversed until the low water mark is reached at 1208 or the starting point for segment traversal is reached (segment traversal at 1208 maintains state and traverses each segment in a circular manner). If the low water mark is not reached an attempt is made to acquire the segment lock in 1210 and if the segment lock is not acquired at 1212 the next segment is traversed starting at 1206.

If the segment lock is acquired at 1212 the segment is checked to determine if it should be merged at 1222. If the segment should be merged the segment tree's read lock is upgraded to a write lock at 1234 and an attempt to acquire the previous segment's lock is made in 1236. If the previous segment's lock is not acquired segment lock is released at 1246 and the next segment is processed at 1206. When the previous segment's lock is acquired at 1238 the traversed segment's information is moved to the previous segment in 1240. Next, the previous segment's lock is released at 1242 and the traversed segment is deleted in 1244. Finally, the segment's lock is released at 1246 and the next segment is processes starting at 1206.

When a segment should not be merged at 1222, policy is used to determine whether the information should be deleted at 1224. If the information should be deleted based on deletion policy the segment's first key and next segment key are preserved at 1226. Once the keys are preserved the segment's internals are transferred to a Temp segment in 1228, the segment lock is released at 1230 and the Temp segment is moved to the purge queue in 1232. Once the temp segment is in the purge the next segment is processed starting at 1206.

After the low water mark is reached in 1208 or all segments have been traversed in 1206 the segment tree's lock (read or write) is released in 1214 and then each policy ordered Temp segment in the purge queue is traversed in 1216 and deleted in 1218. Once all Temp segments are deleted the process returns in 1220.

Figure 13:
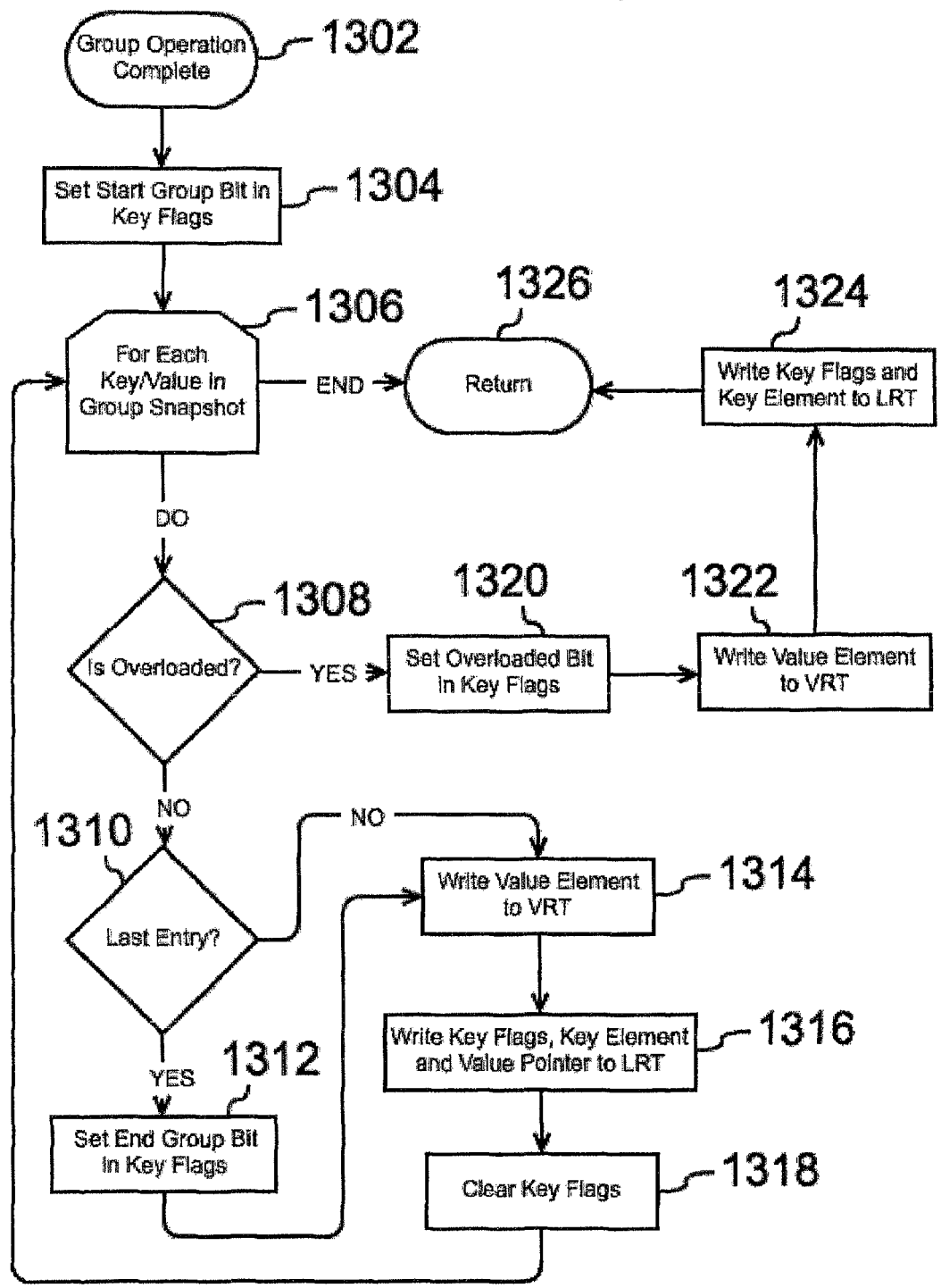
FIG. 13 illustrates a flow chart of streaming real time logging (LRT) and real time value logging (VRT) files in accordance with aspects of the present invention.

FIG. 13 presents a flow chart illustrating aspects of an automated method 1300 of streaming LRT and VRT files upon group operation completion in 1302. When each group operation completes the start group bit in key flags is set in 1304 to indicate the start of the next group operation. Each key/value in the group snapshot is then traversed in 1306 until all key/value pairs have been traversed, the loop ends and the process returns at 1326 or the system is overloaded as detected at 1308 and the loop terminates after overload processing starting at 1320.

When an overload occurs setting the overload bit in the key flags in 1320 and then writing the value element to the VRT in 1322 and the key element to the LRT in 1324 indicate the overload. Since the remainder of the key/value pairs is not processed the overload indication implies information is lost. After the overload indication is written the process returns at 1326.

Under normal operation the system is not overloaded and processing continues at 1310 where a check is performed to determine if this is the last key/value entry. If this is the last entry, the end group bit is set in 1312. The value element is then written to the VRT in 1314 and the key flags, key element and value pointer are written to the LRT file in 1316. Once all elements have been written the key flags are cleared in 1318 and key/value entry processing is restarted at 1306.

Figure 14:
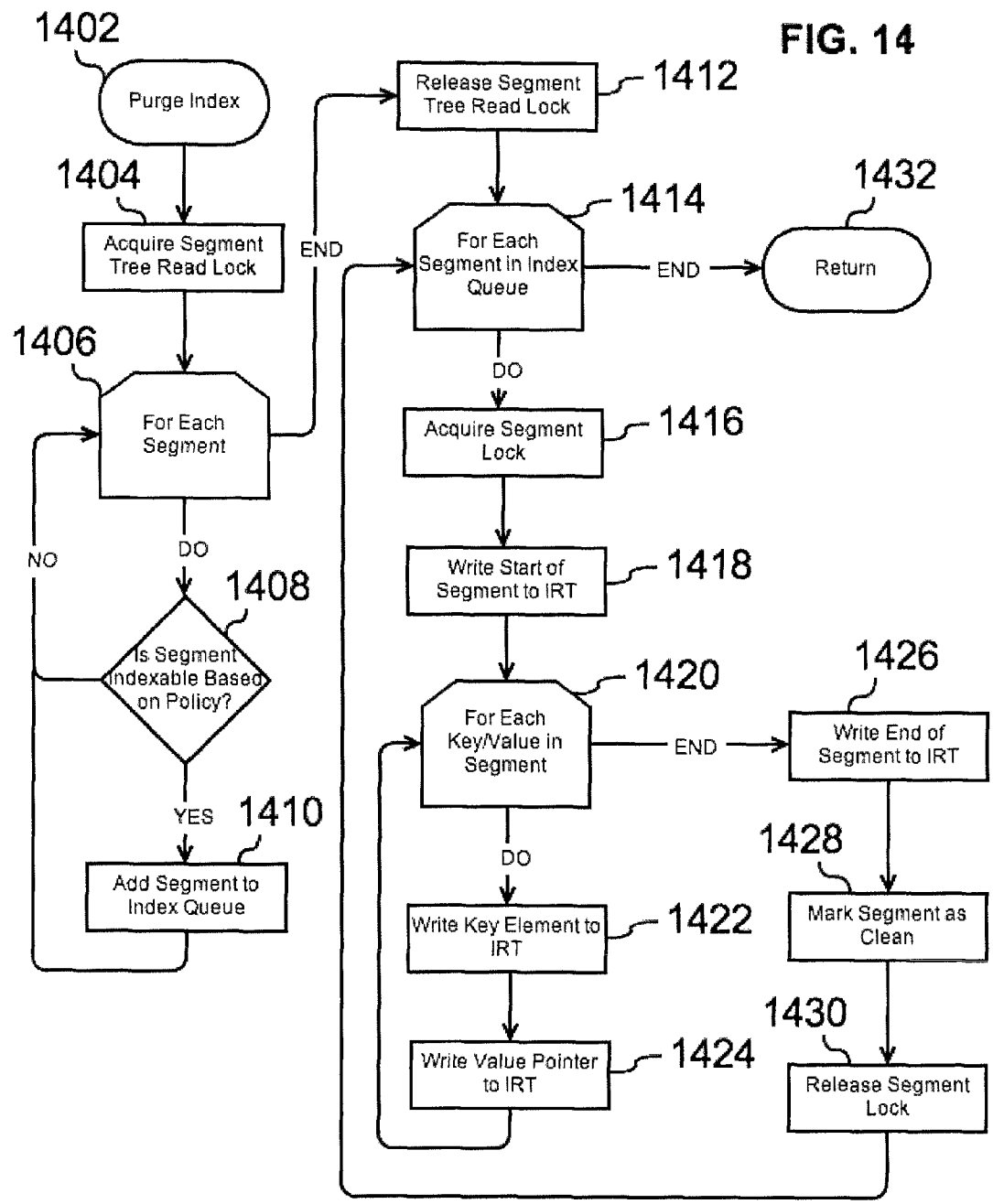
FIG. 14 illustrates a flow chart of streaming indexes upon a purge index request in accordance with aspects of the present invention.

FIG. 14 presents a flow chart illustrating aspects of an automated method 1400 of streaming indexes upon a purge index request starting at 1402. At 1404 the segment tree read lock is acquired and then each segment within the index is traversed at 1406. Each segment is checked to determine if it is indexable based on indexing policies (e.g. is the segment dirty) at 1408. If the segment is indexible it is added to the index queue in 1410 and the process continues at 1406. If the segment is not indexible in 1408 the process continues at 1406. Segments are marked as dirty when they are modified as in FIG. 9.

After each segment has been scanned in 1406 the segment tree read lock is released in 1412 and each segment in the index queue is traversed in 1414. As each segment is traversed its lock is acquired in 1416, a start segment indication is written to the IRT at 1418 and then each key/value within the segment is traversed in 1420. Each key element in 1422 and value pointer in 1424 is written to the IRT. Once all key/value entries are traversed an end segment indication is written to the IRT at 1426, the segment is marked as clean at 1428 and the segment lock is released at 1430. The next segment is then traversed in 1414 and the process ends at 1432 once all segments have been traversed.

Figure 15:
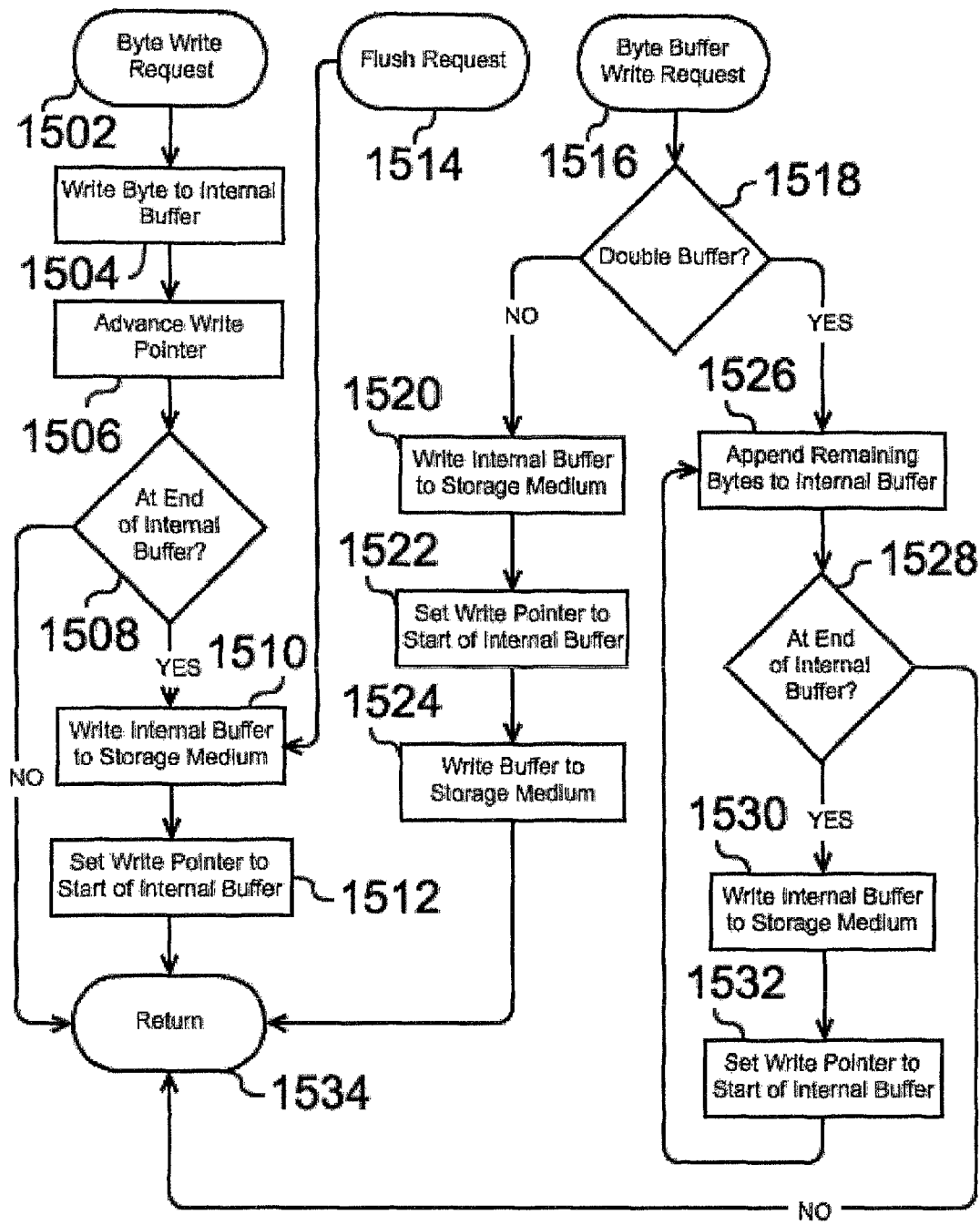
FIG. 15 illustrates a flow chart of buffering write requests in an append-only manner in accordance with aspects of the present invention.

FIG. 15 presents a flow chart illustrating aspects of an automated method 1500 of buffering write requests in an append-only manner. Three write request types are supported; a byte write request 1502, flush request 1514 and byte buffer write request 1516. When a byte write request is received the byte is written to an internal buffer at 1504 and the write pointer into the internal buffer is advanced at 1506. If the end of the internal buffer is reached at 1508, the entire internal buffer is written to the storage medium in an append-only manner at 1510 and the internal write pointer is set to the start of the internal buffer at 1512. The process returns at 1534 if the internal buffer was not full at 1508 or after it has been written to the storage medium.

A flush request at 1514 forces any buffered information to be written to the storage medium starting at 1510. In all cases, 1510 writes whatever information is in the internal buffer to the storage medium and 1512 resets the internal write pointer to the start of the internal buffer. The process return at 1534 once the contents of the internal buffer have been written to the storage medium.

When a byte buffer write request is received at 1516 a double buffering determination is made in 1518. If double buffering is desired bytes from the byte buffer are appended to the internal buffer in 1526. If the append operation filled the internal buffer as determined in 1528 the internal buffer is written to the storage medium in 1530, the internal write pointer is set to the start of the internal buffer at 1532 and the process continues at 1526. If the internal buffer was not filled at 1528 the process returns at 1534.

If double buffering is not enabled at 1518 whatever data is present in the internal buffer is written to the storage medium in 1520 and the internal buffer's write pointer is set to the start of the internal buffer at 1522. The byte buffer is then written to the storage medium at 1524 and the process returns at 1534.

Figure 16:
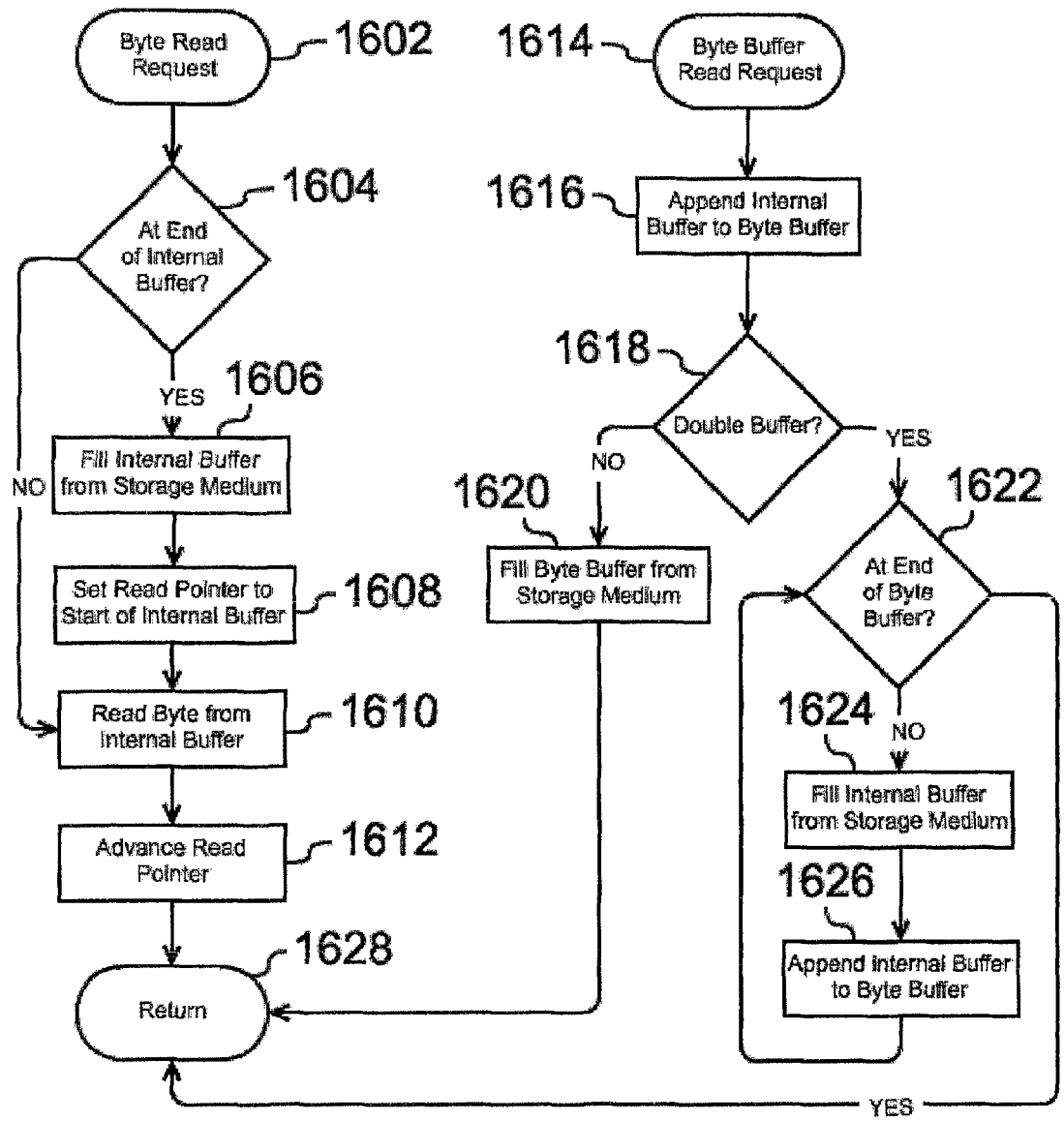
FIG. 16 illustrates a flow chart of buffering read requests in an append-only manner in accordance with aspects of the present invention.

FIG. 16 presents a flow chart illustrating aspects of an automated method 1600 of buffering read requests in an append-only manner. Two read request types are supported; a byte read request 1602 and a byte buffer read request 1614. When a byte read request is received at 1602 an end of internal buffer determination is made at 1604 and if the internal buffer is at its end it if filled from the storage medium in 1606. Once filled the internal buffer's read pointer is set to the start of the internal buffer at 1608. Once the internal buffer has data, either from the determination at 1604 or by being filled at 1606, a byte is read from the internal buffer at 1610 and the read pointer is advanced at 1612. At 1628 the byte is returned.

When a byte buffer read request is received at 1614 the contents of the internal buffer are appended to the byte buffer at 1616. If double buffering is enabled as determined at 1618 the byte buffer is checked to determine if it is full in 1622. If the byte buffer is not full the internal buffer is filled from the storage medium at 1624 and is appended to the byte buffer in 1626. This process continues until the byte buffer is full at 1622 and then the byte buffer is returned at 1628. If double buffering is not enabled the byte buffer is filled from the storage medium in 1620 and is returned in 1628.

Figure 17:
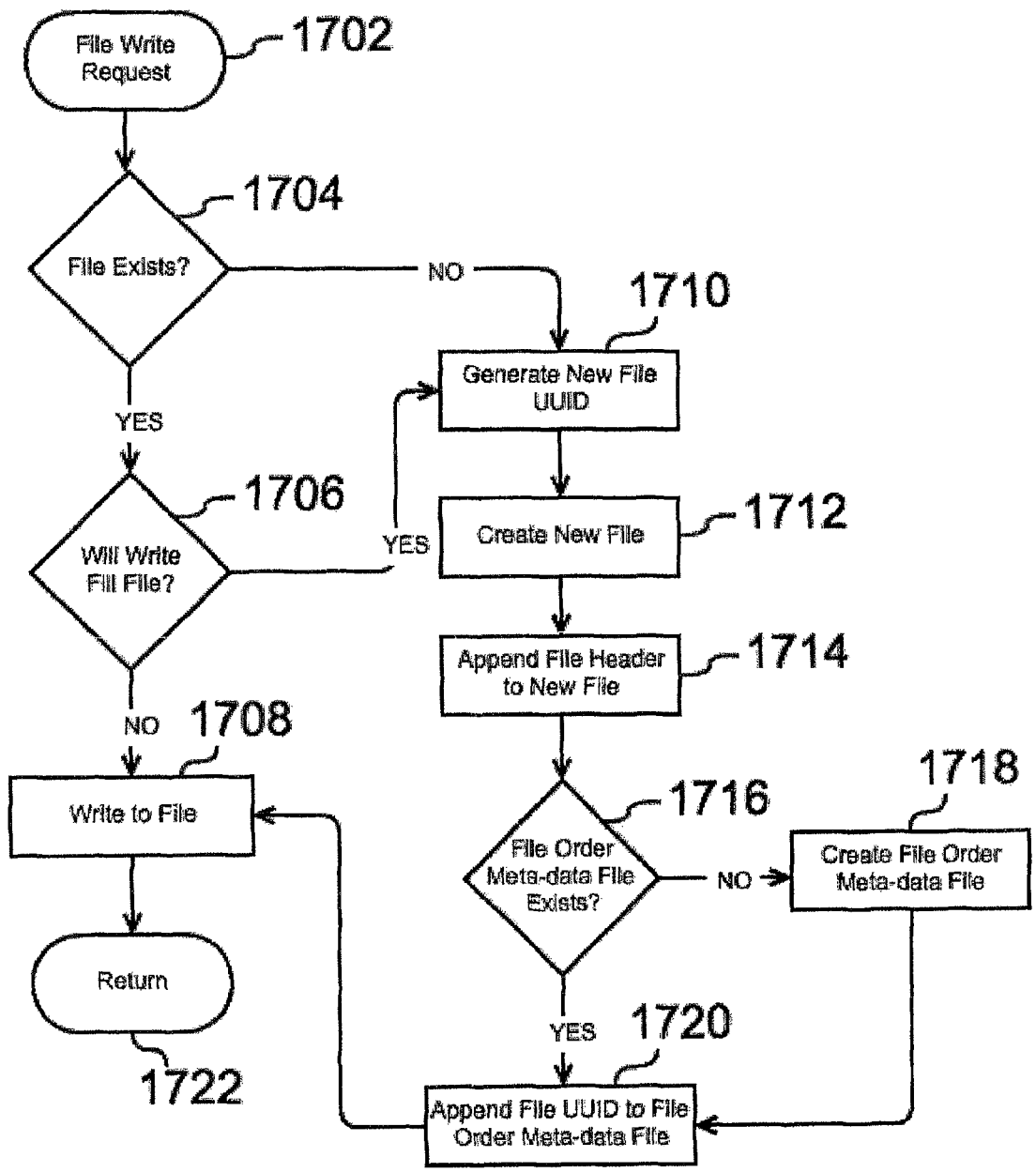
FIG. 17 illustrates a flow chart of append-only file management in accordance with aspects of the present invention.

FIG. 17 presents a flow chart illustrating aspects of an automated method 1700 of append-only file management starting with a file write request at 1702. At 1704 the file is checked for existence. If the file does not exist a new file UUID is generated at 1710, the new file is created at 1712 and the file header is appended in 1714. Next, the file order meta-data file is checked for existence at 1716 and if the file order meta-data file does not exist it is created in 1718. At 1720 the new file's UUID is appended to the file order meta-data file. Once the new file exists and the file order meta-data file is updated the new file is written to at 1708 and the process returns at 1722.

If the file exists at 1704 it is then checked to determine if the write will fill the file at 1706. If the write will fill the file a new file must be created starting at 1710. Otherwise, the file is written to at 1708 and the process returns at 1722.

Figure 18:
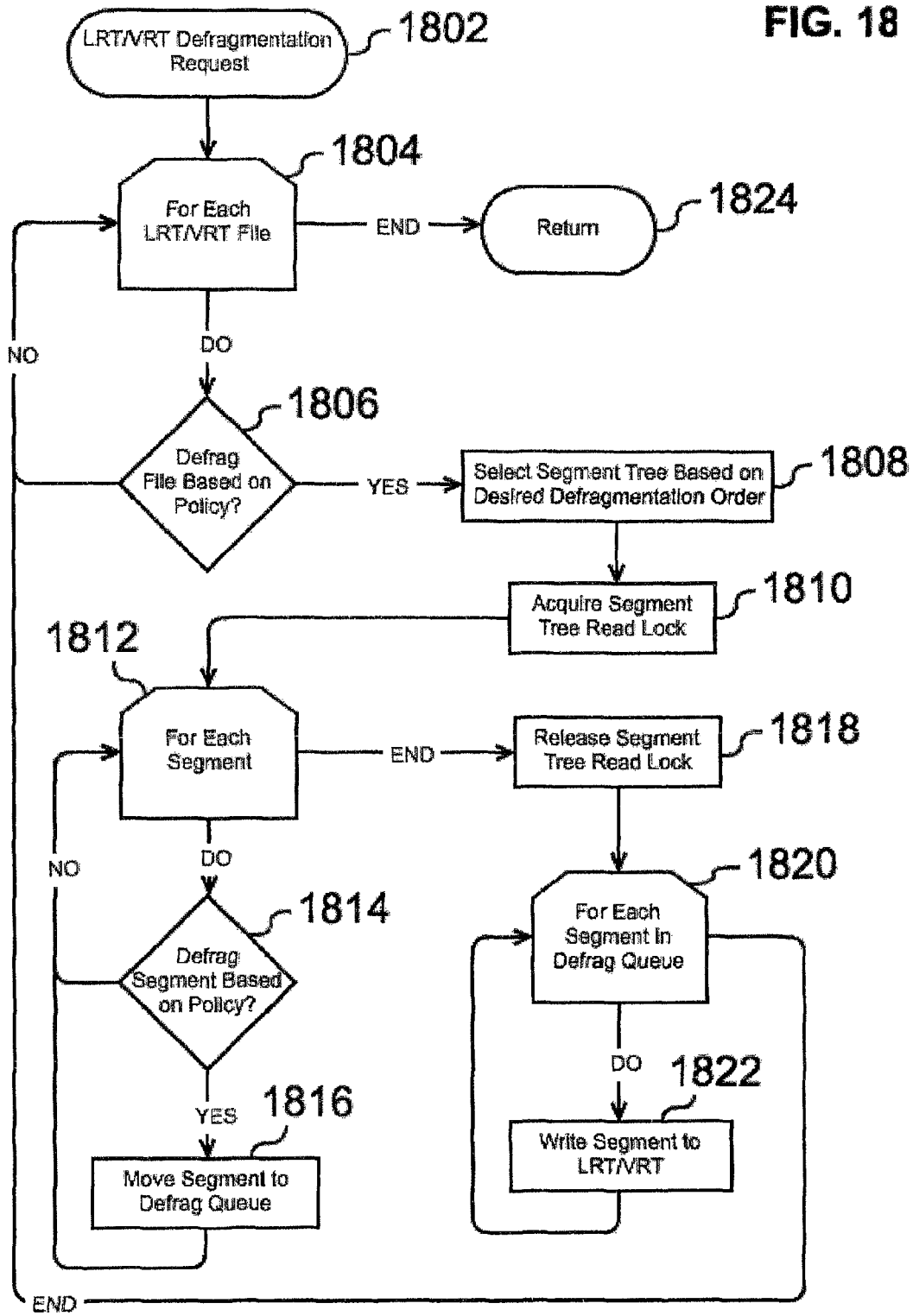
FIG. 18 illustrates a flow chart of receiving and processing a LRT/VRT file defragmentation request in accordance with aspects of the present invention.

FIG. 18 presents a flow chart illustrating aspects of an automated method 1800 of receiving a LRT/VRT file defragmentation request at 1802 and processing that request for each LRT/VRT file under management. At 1804 each LRT/VRT file is traversed and defragmentation policy is used to determine if the file should be defragmented at 1806. If the file should not be defragmented the next LRT/VRT is checked starting at 1804.

When a LRT/VRT file needs to be defragmented the desired defragmentation order is specified by selecting the appropriate segment tree at 1808. Once selected the segment tree read lock is acquired in 1810 and then each segment in the segment tree is traversed in 1812. At 1814 segment defragmentation policy determines if a segment must be defragmented. When a segment must be defragmented it is moved to the segment Defrag Queue in 1816 and the next segment is traversed in 1812. If the segment is not defragmented at 1814 the next segment is traversed in 1812.

Once all segments have been traversed in 1812 the segment tree read lock is released at 1818 and each segment in the Defrag Queue is traversed in 1820. As each segment is traversed it is written to the LRT/VRT file at 1822 and the next segment is traversed at 1820. Once all segments have been traversed the next LRT/VRT file is traversed at 1804. After all LRT/VRT files are traversed the process returns at 1824.

Figure 19:
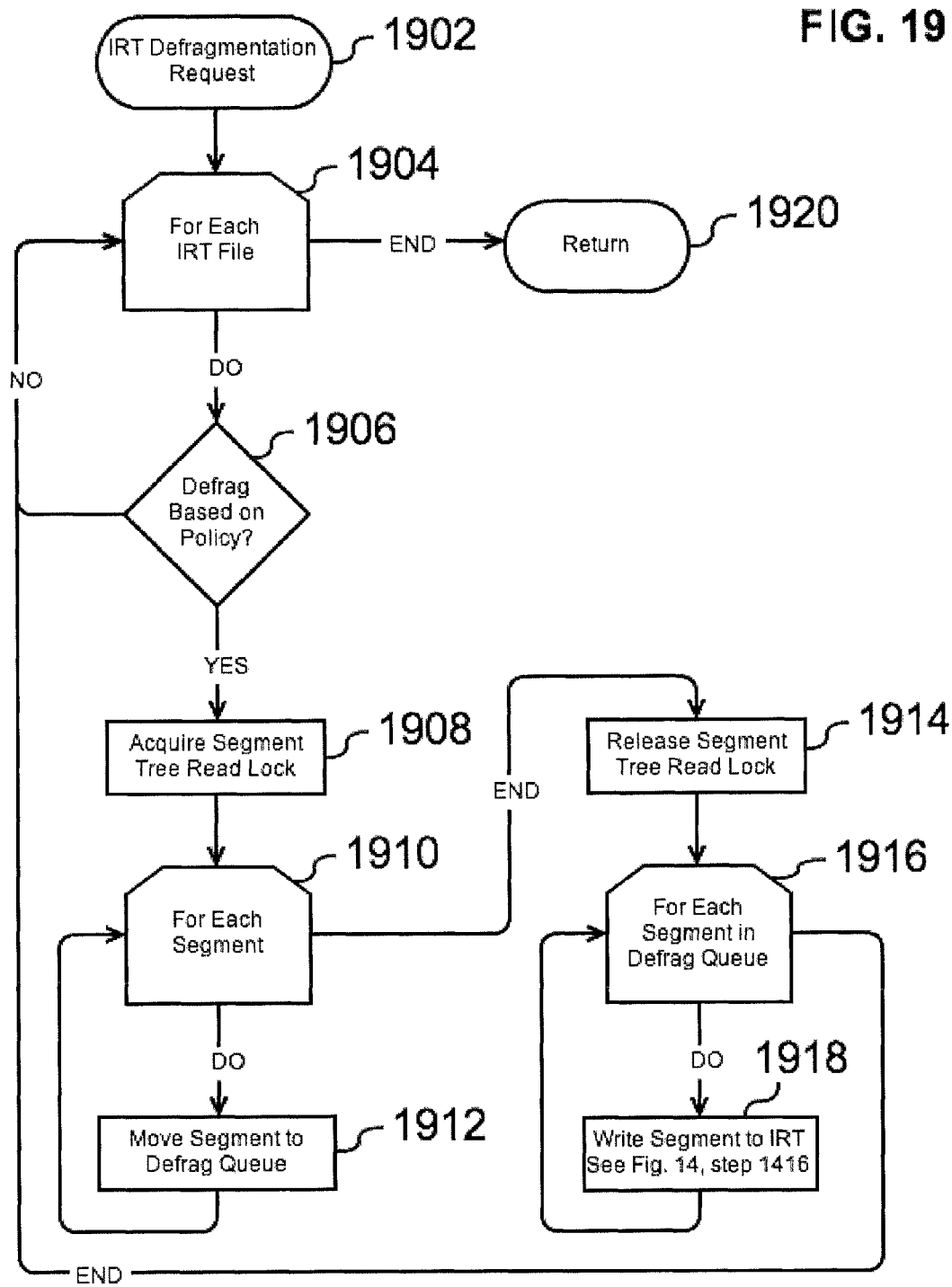
FIG. 19 illustrates a flow chart of receiving and processing a real time key tree indexing (IRT) file defragmentation request in accordance with aspects of the present invention.

FIG. 19 presents a flow chart illustrating aspects of an automated method 1900 of receiving a IRT file defragmentation request at 1902 and processing that request. At 1904 each IRT file is traversed and defragmentation policy is applied at 1906. If the IRT file should not be defragmented at 1906 the next IRT file is processed at 1904.

When a IRT file needs to be defragmented the segment tree read lock is acquired at 1908 and each segment is traversed in 1910. Each traversed segment is moved to the Defrag Queue in 1912 and the next segment is traversed in 1910. Once all segments have been traversed in 1910 the segment tree read lock is released in 1914. Next, each segment in the Defrag Queue is traversed in 1916 and written to the IRT file in 1918 using the process in FIG. 14, step 1416. Once all segments in the Defrag Queue are processed in 1916 the next IRT file is processed in 1904. After all IRT files are traversed this process returns at 1920.

While aspects presented herein have been described in conjunction with the example aspects of implementations outlined above, various alternatives, modifications, variations, improvements, and/or substantial equivalents, whether known or that are or may be presently unforeseen, may become apparent to those having at least ordinary skill in the art. Accordingly, the example illustrations, as set forth above, are intended to be illustrative, not limiting. Various changes may be made without departing from the spirit and scope hereof. Therefore, aspects are intended to embrace all known or later-developed alternatives, modifications, variations, improvements, and/or substantial equivalents.

What is claimed is:

1. A computer assisted method for storing and retrieving information, the method including:
receiving information;
organizing said information for storage and retrieval based on qualities of a storage medium; and
at least one selected from a group consisting of presenting and storing said organized information,
wherein said storing comprises maintaining a representation of the information in-memory or in non-transient storage, wherein the in-memory representation of the information is organized independently from the non-transient representation of the information, wherein the information is independently organized or space and time performance based on the qualities of the storage medium,
wherein said information is at least one selected from a group consisting of created, read, updated and deleted as key/value pairs, and
wherein keys and values are represented by key elements and value elements, the key elements and value elements being encoded using at least one selected from a group consisting of a state flag, a fixed size encoding, a size delimited variable size encoding, and a framed variable length encoding.

2. The method of claim 1, wherein the information is stored in at least one selected from a group consisting of memory and a non-transitory computer readable medium.

3. The method of claim 1, wherein organizing said information includes optimizing said information for sequential read access.

4. The method of claim 1, wherein organizing said information includes optimizing said information for sequential write access.

5. The method of claim 4, further comprising:
organizing said information in an append-only manner.

6. The method of claim 5, wherein said information is stored to a non-transitory computer-readable medium in said append-only manner.

7. The method of claim 1, wherein said information is at least one selected from a group consisting of created, read, updated and deleted contemporaneously.

8. The method of claim 1, wherein the in-memory representation of information is different from the non-transient storage of information.

9. The method of claim 8, wherein the in-memory representation of information of information and the non-transient storage of information are approximately optimized for their respective mediums.

10. The method of claim 1, wherein the information is streamed to and from non-transient mediums.

11. The method of claim 1, wherein keys, values, key elements and value elements are referenced by key pointers and value pointers.

12. The method of claim 11, wherein key pointers and value pointers may be fixed length or variable length.

13. The method of claim 11, wherein key pointers and value pointers are one selected from a group consisting of implicit, when referencing fixed length keys and values, and explicit, when referencing variable length keys and values.

14. The method of claim 1, wherein primary and secondary indexing are based on at least one selected from a group consisting of a create, a read, an update and a delete operation on key/value pairs.

15. The method of claim 1, wherein LRT files and VRT files comprise a generalized state log.

16. The method of claim 15, wherein the state log comprises at least one selected from a group consisting of a state, a flag and an indication of operations and group boundaries.

17. The method of claim 16, wherein the groups comprise at least one selected from a group consisting of:
variable sized, wherein flags indicate group operations including at least one of transactions and defragmentation;
compressed groups; and
error detecting and correcting code.

18. The method of claim 1, wherein non-transient information is stored in files prefaced by append-only headers describing at least one selected from a group consisting of the file's format, datastore membership, index membership, file identifier and preceding file identifier used for append only file chaining.

19. The method of claim 18, wherein the header describes the file's format, wherein the header comprises at least one selected from a group consisting of a flag, a file type, an encoding type, a header length and header data.

20. The method of claim 1, wherein append-only metadata files represent at least one selected from a group consisting of:
information about the datastore itself; and
file order and schema.

21. The method of claim 1, wherein said information is stored in variable length segments.

22. The method of claim 21, wherein segments contain metadata, the metadata being hierarchical.

23. A computer assisted method for storing and retrieving information, the method including:
receiving information;
organizing said information for storage and retrieval based on qualities of a storage medium, wherein the information is organized for space and time performance based on the qualities of the storage medium; and
at least one selected from a group consisting of presenting and storing said organized information,
wherein said information is at least one selected from a group consisting of created, read, updated and deleted as key/value pairs,
wherein primary and secondary indexing are based on at least one selected from a group consisting of a create, a read, an update and a delete operation on key/value pairs, and
wherein keys used in primary and secondary indexing comprise at least one selected from a group consisting of a composite key and a non-unique key, and wherein the keys are derived from both a key part and value part of key/value pairs, wherein unique information is identified by key and value pointers, the key and value pointers identifying instances in time and in space, thereby enabling Multi Version Concurrency Control (MVCC).

24. The method of claim 23, wherein segments contain said unique key and value pointers, thereby supporting MVCC primary and secondary indexes.

25. A computer assisted method for storing and retrieving information, the method including:

receiving information;
organizing said information for storage and retrieval based on qualities of a storage medium, wherein the information is organized for space and time performance based on the qualities of the storage medium; and
at least one selected from a group consisting of presenting and storing said organized information,
wherein said information is stored in variable length segments containing metadata, the metadata being hierarchical, and
wherein metadata comprises at least one selected from a group consisting of:
computed information related to the information comprised within segments and segment summaries;
error detection and correction information;
statistical and aggregated information used for internal optimizations including defragmentation;
information representing data consistency aspects of segments;
information representing physical aspects of the segments;
information representing aggregations of segment information; and
information generated automatically in the response to queries and query patterns.

26. The method of claim 25, wherein segment length is determined based on at least one selected from a group consisting of policy, optimization of central processing unit memory, and optimization of input and output.

27. The method of claim 25, wherein segments are summarized and hierarchical.

28. The method of claim 25, wherein segments are purged from memory based on at least one selected from a group consisting of memory pressure and policy.

29. The method of claim 25, wherein segments are split into multiple segments based on at least one selected from a group consisting of size and policy.

30. The method of claim 25, wherein segments are merged based on at least one selected from a group consisting of size and policy.

31. The method of claim 25, wherein segments comprise at least one selected from a group consisting of a compact segment and compressed segment.

32. A computer assisted method for storing and retrieving information, the method including:
receiving information;
organizing said information for storage and retrieval based on qualities of a storage medium, wherein the information is organized for space and time performance based on the qualities of the storage medium; and
at least one selected from a group consisting of presenting and storing said organized information,
wherein said information is stored in variable length segments,
wherein segments comprise at least one selected from a group consisting of a compact segment and compressed segment, and
wherein the segment comprises a compact segment, wherein compaction is achieved by identifying longest matching key prefixes and subsequently storing the longest matching key prefixes once followed by each matching key represented by its suffix, wherein one of a plurality of longest matching prefixes per segment are chosen to optimize at least one characteristic, the at least one characteristic being selected from a group consisting of central processing unit utilization and segment size.

33. The method of claim 32, wherein the segments comprise error detecting and correcting code.

34. The method of claim 32, wherein the variable length segments are stored on non-transient storage within append-only files which are limited in size and chained together through previous file identifiers in their headers.

35. The method of claim 34, wherein the variable length segments are generalized indexes into the state log of key/value pairs.

36. The method of claim 32, wherein the segments are stored by key and ordered by key in one selected from a group consisting of a segment tree and an information tree.

37. The method of claim 36, wherein segments stored in the segment tree are purged from memory to non-transient storage and loaded from non-transient storage into memory.

38. The method of claim 32, wherein segment information is stored in an information cache.

39. The method of claim 38, wherein information may be shared by segments representing primary and secondary indexes.

40. An automated system for storing and retrieving information, the system comprising:
means for receiving information;
means for organizing said information for storage and retrieval based on the qualities of a storage medium, wherein the information is organized for space and time performance based on the qualities of the storage medium; and
means for, at least one selected from a group consisting of, presenting and storing said organized information,
wherein the means for storing comprises means for maintaining a representation of the information in-memory or in non-transient storage, wherein the in-memory representation of the information is organized independently from the non-transient representation of the information,
wherein said information is at least one selected from a group consisting of created, read, updated and deleted as key/value pairs, and
wherein keys and values are represented by key elements and value elements, the key elements and value elements being encoded using at least one selected from a group consisting of a state flag, a fixed size encoding, a size delimited variable size encoding, and a framed variable length encoding.

41. A computer program product comprising a computer readable medium having control logic stored therein for causing a computer to perform storage and retrieval of information, the control logic code for:
receiving information;
organizing said information for storage and retrieval based on the qualities of a storage medium, wherein the information is organized for space and time performance based on the qualities of the storage medium; and
at least one selected from a group consisting of presenting and storing said organized information,
wherein said storing comprises maintaining a representation of the information in-memory or in non-transient storage, wherein the in-memory representation of the information is organized independently from the non-transient representation of the information, wherein said information is at least one selected from a group consisting of created, read, updated and deleted as key/value pairs, and wherein keys and values are represented by key elements and value elements, the key elements and value elements being encoded using at least one selected from a group consisting of a state flag, a fixed size encoding, a size delimited variable size encoding, and a framed variable length encoding.

42. The computer program product of claim 41, wherein the in-memory representation of information is different from the non-transient storage of information, and wherein the in-memory representation of information and the non-transient storage of information are approximately optimized for their respective mediums.

43. An automated system for the storage and retrieval of information, the system comprising:
    at least one processor;
    a user interface functioning via the at least one processor; and
    a repository accessible by the at least one processor;
    wherein the at least one processor is configured to:
        receive information;
        organize said information for storage and retrieval based on the qualities of a storage medium, wherein the information is organized for space and time performance based on the qualities of the storage medium; and
        at least one selected from a group consisting of present and store said organized information,
    wherein said storing comprises maintaining a representation of the information in-memory or in non-transient storage, wherein the in-memory representation of the information is organized independently from the non-transient representation of the information,
    wherein said information is at least one selected from a group consisting of created, read, updated and deleted as key/value pairs, and
    wherein keys and values are represented by key elements and value elements, the key elements and value elements being encoded using at least one selected from a group consisting of a state flag, a fixed size encoding, a size delimited variable size encoding, and a framed variable length encoding.

44. The automated system of claim 43, wherein the in-memory representation of information is different from the non-transient storage of information, and wherein the in-memory representation of information and the non-transient storage of information are approximately optimized for their respective mediums.

45. A computer program product comprising a computer readable medium having control logic stored therein for causing a computer to perform storage and retrieval of information, the control logic code for:
    receiving information;
    organizing said information for storage and retrieval based on qualities of a storage medium, wherein the information is organized for space and time performance based on the qualities of the storage medium; and
    at least one selected from a group consisting of presenting and storing said organized information,
    wherein said information is at least one selected from a group consisting of created, read, updated and deleted as key/value pairs,
    wherein primary and secondary indexing are based on at least one selected from a group consisting of a create, a read, an update and a delete operation on key/value pairs, and
    wherein keys used in primary and secondary indexing comprise at least one selected from a group consisting of a composite key and a non-unique key, and wherein the keys are derived from both a key part and value part of key/value pairs, wherein unique information is identified by key and value pointers, the key and value pointers identifying instances in time and in space, thereby enabling Multi Version Concurrency Control (MVCC).

46. An automated system for the storage and retrieval of information, the system comprising:
    at least one processor; and
    a repository accessible by the at least one processor;
    wherein the at least one processor is configured to:
        receive information;
        organize said information for storage and retrieval based on qualities of a storage medium, wherein the information is organized for space and time performance based on the qualities of the storage medium; and
        at least one selected from a group consisting of present and store said organized information,
    wherein said information is at least one selected from a group consisting of created, read, updated and deleted as key/value pairs,
    wherein primary and secondary indexing are based on at least one selected from a group consisting of a create, a read, an update and a delete operation on key/value pairs, and
    wherein keys used in primary and secondary indexing comprise at least one selected from a group consisting of a composite key and a non-unique key, and wherein the keys are derived from both the key part and value part of key/value pairs, wherein unique information is identified by key and value pointers, the key and value pointers identifying instances in time and in space, thereby enabling Multi Version Concurrency Control (MVCC).

47. A computer program product comprising a computer readable medium having control logic stored therein for causing a computer to perform storage and retrieval of information, the control logic code for:
    receiving information;
    organizing said information for storage and retrieval based on qualities of a storage medium, wherein the information is organized for space and time performance based on the qualities of the storage medium; and
    at least one selected from a group consisting of presenting and storing said organized information,
    wherein said information is stored in variable length segments containing metadata, the metadata being hierarchical, and
    wherein the metadata comprises at least one selected from a group consisting of:
    computed information related to the information comprised within segments and segment summaries;
    error detection and correction information;
    statistical and aggregated information used for internal optimizations including defragmentation;
    information representing data consistency aspects of segments;

information representing physical aspects of the segments;

information representing aggregations of segment information; and information generated automatically in the response to queries and query patterns.

48. An automated system for the storage and retrieval of information, the system comprising:

at least one processor; and a repository accessible by the at least one processor; wherein the at least one processor is configured to:

receive information;

organize said information for storage and retrieval based on qualities of a storage medium, wherein the information is organized for space and time performance based on the qualities of the storage medium; and at least one selected from a group consisting of present and store said organized information, wherein said information is stored in variable length segments containing metadata, the segment metadata being hierarchical, and wherein segment metadata comprises at least one selected from a group consisting of:

computed information related to the information comprised within segments and segment summaries;

error detection and correction information;

statistical and aggregated information used for internal optimizations including defragmentation;

information representing data consistency aspects of segments;

information representing physical aspects of the segments;

information representing aggregations of segment information; and information generated automatically in the response to queries and query patterns.

49. A computer program product comprising a computer readable medium having control logic stored therein for causing a computer to perform storage and retrieval of information, the control logic code for:

receiving information;

organizing said information for storage and retrieval based on qualities of a storage medium, wherein the information is organized for space and time performance based on the qualities of the storage medium; and at least one selected from a group consisting of presenting and storing said organized information, wherein said information is stored in variable length segments, wherein segments comprise at least one selected from a group consisting of a compact segment and compressed segment, and wherein the segment comprises a compact segment, wherein compaction is achieved by identifying longest matching key prefixes and subsequently storing the longest matching key prefixes once followed by each matching key represented by its suffix, wherein one of a plurality of longest matching prefixes per segment are chosen to optimize at least one characteristic, the at least one characteristic being selected from a group consisting of central processing unit utilization and segment size.

50. An automated system for the storage and retrieval of information, the system comprising:

at least one processor; and a repository accessible by the at least one processor; wherein the at least one processor is configured to:

receive information;

organize said information for storage and retrieval based on qualities of a storage medium, wherein the information is organized for space and time performance based on the qualities of the storage medium; and at least one selected from a group consisting of present and store said organized information, wherein said information is stored in variable length segments, wherein segments comprise at least one selected from a group consisting of a compact segment and compressed segment, and wherein the segment comprises a compact segment, wherein compaction is achieved by identifying longest matching key prefixes and subsequently storing the longest matching key prefixes once followed by each matching key represented by its suffix, wherein one of a plurality of longest matching prefixes per segment are chosen to optimize at least one characteristic, the at least one characteristic being selected from a group consisting of central processing unit utilization and segment size.

51. The method of claim 1, wherein the information is organized for durability in addition to space and time performance based on the qualities of the storage medium.

52. The method of claim 1, wherein the information is organized based on error correction complexity in addition to space and time performance based on the qualities of the storage medium.

53. The method of claim 1, wherein the information is organized for read performance and write performance based on the qualities of the storage medium.

* * * * *